(12) United States Patent
Jung

(10) Patent No.: US 11,910,248 B2
(45) Date of Patent: Feb. 20, 2024

(54) METHOD AND APPARATUS FOR PERFORMING HANDOVER IN A NEXT-GENERATION COMMUNICATION SYSTEM

(71) Applicant: Samsung Electronics Co., Ltd., Suwon-si (KR)

(72) Inventor: Sangyeob Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 127 days.

(21) Appl. No.: 17/560,046

(22) Filed: Dec. 22, 2021

(65) Prior Publication Data

US 2022/0210701 A1 Jun. 30, 2022

(30) Foreign Application Priority Data

Dec. 24, 2020 (KR) .......................... 10-2020-0183060

(51) Int. Cl.
*H04W 36/00* (2009.01)
*H04W 36/30* (2009.01)
*H04W 88/06* (2009.01)

(52) U.S. Cl.
CPC ... *H04W 36/0022* (2013.01); *H04W 36/0079* (2018.08)

(58) Field of Classification Search
CPC ......... H04W 36/0022; H04W 36/0079; H04W 24/02; H04W 36/0083; H04W 36/14;
(Continued)

(56) References Cited

U.S. PATENT DOCUMENTS 9,516,533 B2 * 12/2016 Xu .................... H04W 24/02
9,736,744 B2 * 8/2017 Park ................... H04W 36/14
(Continued)

FOREIGN PATENT DOCUMENTS

WO 2016122589 A1 8/2016
WO WO-2022159015 A1 * 7/2022

OTHER PUBLICATIONS

3GPP TSG-RAN WG2 Meeting #113-e R2-2100184 Online, Jan. 25-Feb. 5, 2021, pp. 1-3.*
(Continued)

*Primary Examiner* — Ahmed Elallam

(57) ABSTRACT

The disclosure relates to a 5G or pre-5G communication system for supporting a data transmission rate higher than a 4G communication system such as LTE. A method performed by a UE in a communication system includes: receiving, from a base station associated with NR, a command message for inter-RAT handover from the NR to a target RAT, wherein the command message includes information on a type of the target RAT; performing a procedure associated with the inter-RAT handover based on the command message; in case that a failure condition for the inter-RAT handover is satisfied, identifying that the inter-RAT handover fails; and in case that the type of the target RAT is set to EUTRA and the UE supports a radio link failure report for inter-RAT MRO EUTRA, storing handover failure information in a variable for the radio link failure report based on an identification that the inter-RAT handover fails.

16 Claims, 11 Drawing Sheets

(58) Field of Classification Search
CPC ......... H04W 36/0077; H04W 36/0085; H04W 36/08; H04W 36/305; H04W 88/06
See application file for complete search history.

(56) References Cited

U.S. PATENT DOCUMENTS

| | | | | |
|---|---|---|---|---|
| 10,225,756 | B2* | 3/2019 | Reider | H04W 24/10 |
| 10,595,167 | B2* | 3/2020 | Chen | H04W 4/50 |
| 11,382,061 | B2* | 7/2022 | Kim | H04W 76/15 |
| 11,638,191 | B2* | 4/2023 | Araujo | H04W 36/08 370/331 |
| 2015/0036512 | A1* | 2/2015 | Xu | H04W 24/10 370/242 |
| 2016/0142956 | A1* | 5/2016 | Wang | H04W 24/02 370/221 |
| 2017/0127331 | A1* | 5/2017 | Wu | H04W 76/27 |
| 2018/0192337 | A1 | 7/2018 | Ryu et al. | |
| 2019/0058997 | A1 | 2/2019 | Futaki et al. | |
| 2019/0253944 | A1 | 8/2019 | Kim | |
| 2019/0335365 | A1 | 10/2019 | Ying et al. | |
| 2022/0038968 | A1* | 2/2022 | Latheef | H04W 36/0058 |
| 2022/0174512 | A1* | 6/2022 | Rune | H04B 17/318 |
| 2022/0394806 | A1* | 12/2022 | Rugeland | H04W 76/27 |

OTHER PUBLICATIONS

International Search Report and Written Opinion of the International Searching Authority dated Apr. 2, 2022, in connection with International Application No. PCT/KR2021/019653, 6 pages.

Supplementary European Search Report dated Oct. 17, 2023, in connection with European Patent Application No. 21911550.8, 13 pages.

3GPP TS 38.331 V16.2.0 (Sep. 2020) Technical Specification; 3rd Generation Partnership Project; Technical Specification Group Radio Access Network; NR; Radio Resource Control (RRC) protocol specification (Release 16); 921 pages.

CATT et al., "Further Considerations and Modifications on MRO in UE RLF Report," 3GPP TSG-RAN WG2 Meeting #110 electronic Online, Jun. 1-Jun. 12, 2020, R2-2004413, 46 pages.

* cited by examiner

METHOD AND APPARATUS FOR PERFORMING HANDOVER IN A NEXT-GENERATION COMMUNICATION SYSTEM

CROSS-REFERENCE TO RELATED APPLICATION

This application is based on and claims priority under 35 U.S.C. § 119 to Korean Patent Application No. 10-2020-0183060, filed on Dec. 24, 2020, in the Korean Intellectual Property Office, the disclosure of which is herein incorporated by reference in its entirety.

BACKGROUND

1. Field

The disclosure relates to an operation of a user equipment (UE) and a base station in a next generation mobile communication system. Particularly, the disclosure relates to an inter-radio access technology (RAT) handover and an intra-RAT handover in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Discussion on a method for a UE to perform handover is being conducted in order to efficiently implement a communication system in the above-described 5G system.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method of overcoming drawbacks which may occur when a handover is performed. Particularly, there is provided a method of overcoming drawbacks which may occur when an inter-radio access technology (RAT) handover or an intra-RAT handover is successfully performed or fails.

According to an embodiment of the disclosure, a method performed by a user equipment (UE) in a communication system is provided. The method including: receiving, from a base station associated with new radio-radio access (NR), a command message for inter-radio access technology (RAT) handover from the NR to a target RAT, wherein the command message includes information on a type of the target RAT; performing a procedure associated with the inter-RAT handover based on the command message; in case that a failure condition for the inter-RAT handover is satisfied, identifying that the inter-RAT handover fails; and in case that the type of the target RAT is set to evolved universal terrestrial radio access (EUTRA) and the UE supports a radio link failure report for inter-RAT mobility robustness optimization (MRO) EUTRA, storing handover failure information in a variable for the radio link failure report based on an identification that the inter-RAT handover fails.

According to an embodiment of the disclosure, a UE in a communication system is provided. The UE comprises: a transceiver; and a controller operably coupled to the transceiver, and configured to: receive, from a base station associated with NR via the transceiver, a command message for inter-RAT handover from the NR to a target RAT, wherein the command message includes information on a type of the target RAT, perform a procedure associated with the inter-RAT handover based on the command message, in case that a failure condition for the inter-RAT handover is satisfied, identify that the inter-RAT handover fails, and in case that the type of the target RAT is set to EUTRA and the UE supports a radio link failure report for inter-RAT mobility MRO EUTRA, store handover failure information in a variable for the radio link failure report based on an identification that the inter-RAT handover fails.

According to various embodiments of the disclosure, there is provided a method of overcoming drawbacks which may occur when an inter-radio access technology (RAT) handover or an intra-RAT handover is successfully performed or fails.

According to an embodiment of the disclosure, there is provided a method of processing a timer of a user equipment (UE) which successfully performs an inter-RAT handover, and the UE is capable of appropriately performing a logged minimization of drive test (MDT) operation.

In addition, according to an embodiment of the disclosure, there is provided a method of storing handover failure information associated with a UE if an inter-RAT handover fails, and thus, an efficient communication system may be implemented.

In addition, according to an embodiment of the disclosure, there is provided a method of storing handover failure information associated with a UE if an intra-RAT handover fails, and thus, an efficient communication system may be implemented.

Effects that could be obtained based on the disclosure are not limited to the above-described effects, and those skilled in the art would be clearly understand, based on the descriptions provided below, other effects which are not mentioned above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, various embodiments of the disclosure will be described in detail with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB." That is, a base station described as "eNB" may indicate "gNB."

Figure 1:
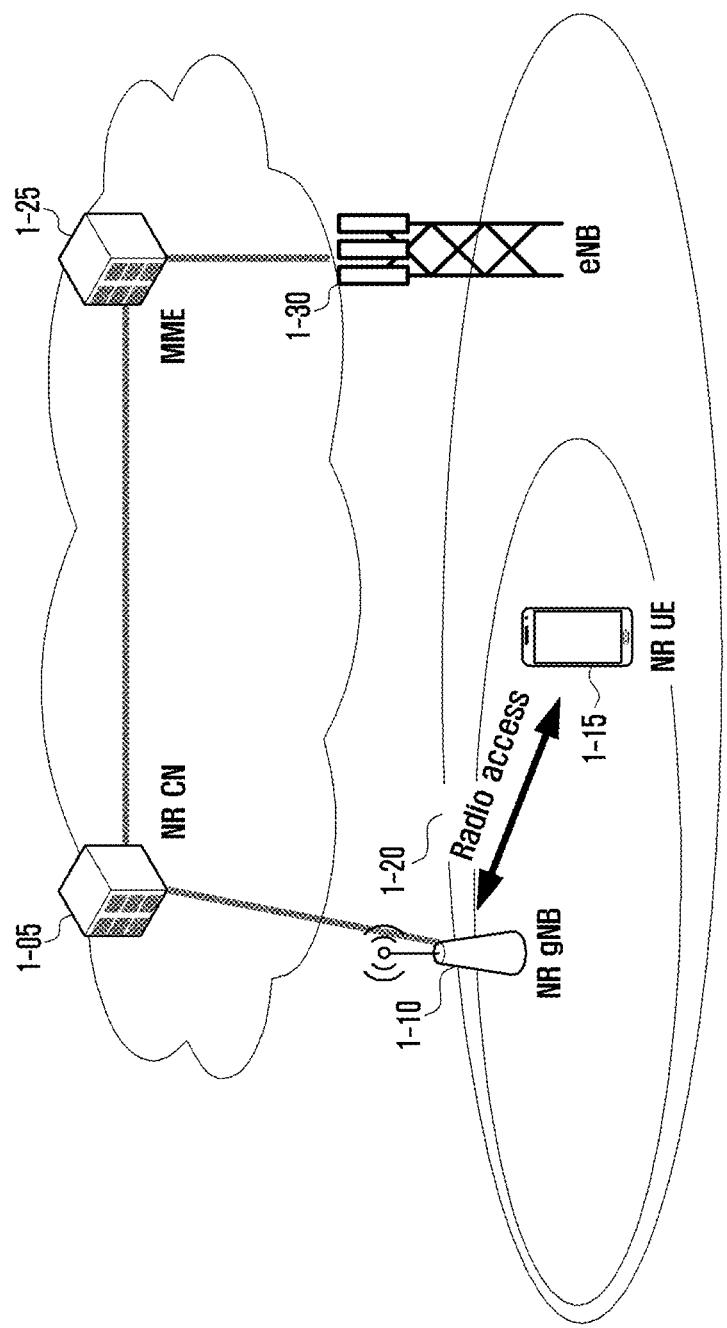
FIG. 1 is a diagram illustrating the structure of a next generation mobile communication system according to an embodiment of the present disclosure.

FIG. 1 is a diagram illustrating the structure of a next generation mobile communication system according to an embodiment of the present disclosure.

Referring to FIG. 1, as described in the drawing, a radio access network of a next generation mobile communication system (hereinafter, NR or 5G) may include a next generation base station (a new radio node B (hereinafter, an NR gNB or an NR base station)) 1-10 and a new radio core network (NR CN) 1-05. A new radio user equipment (NR UE) (or a UE) 1-15 may access an external network via an NR gNB 1-10 and an NR CN 1-05.

In FIG. 1, the NR gNB 1-10 corresponds to an evolved nodeB (eNB) of a legacy LTE system. The NR gNB is connected to the NR UE 1-15 via a wireless channel, and may provide a better service than a service from a legacy NodeB. In the next generation mobile communication system, all user traffic is serviced via a shared channel. Accordingly, there is a desire for a device that performs scheduling by collecting state information such as buffer states, available transmission power states, channel conditions, and the like in association with UEs. The NR NB 1-10 takes charge of the same. A single NR gNB generally controls a plurality of cells.

In order to implement ultra-high speed data transmission when compared to legacy LTE, a bandwidth greater than or equal to the current maximum bandwidth may be used, and an orthogonal frequency division multiplexing (OFDM) is used as a radio access technology and a beamforming technology is additionally used. In addition, an adaptive modulation and coding (AMC) scheme that determines a modulation scheme and a channel coding rate may be applied based on the channel state of a UE. The NR CN 1-05 performs a function of supporting mobility, configuring a bearer, configuration a quality of service (QoS), and the like. The NR CN is a device that is in charge of various control functions in addition to a mobility management function associated with a UE, and may be connected to a plurality of base stations. In addition, the next generation mobile communication system may also interoperate with a legacy LTE system, and an NR CN is connected to a mobility management entity (MME) 1-25 via a network interface. The MME is connected to an eNB 1-30 which is a legacy base station.

Figure 2:
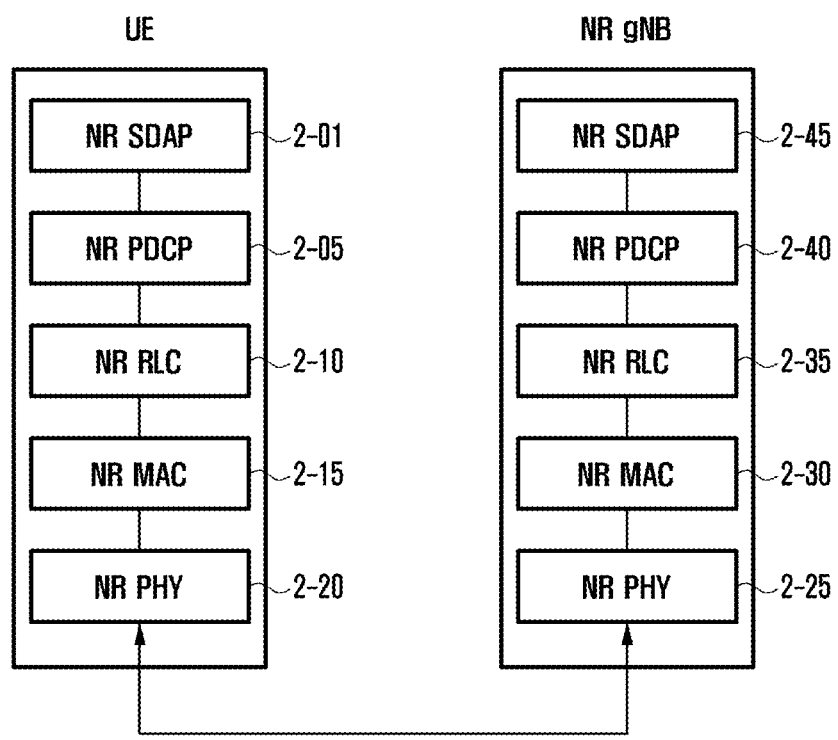
FIG. 2 is a diagram illustrating the structure of a radio protocol of a next generation mobile communication system according to an embodiment of the present disclosure.

FIG. 2 is a diagram illustrating the structure of a radio protocol of a next generation mobile communication system according to an embodiment of the present disclosure.

Referring to FIG. 2, the radio protocol of the next generation mobile communication system may include an NR service data adaptation protocol (SDAP) 2-01 and 2-45, an NR packet data convergence protocol (PDCP) 2-05 and 2-40, an NR radio link control (RLC) 2-10 and 2-35, and an NR medium access control (MAC) 2-15 and 2-30 for each of a UE and an NR gNB.

The main functions of the NR SDAP 2-01 and 2-45 may include some of the following functions:
  Transfer of user data (transfer or user plane data);
  Mapping between a QoS flow and a data bearer (DRB) for both downlink and uplink (mapping between a QoS flow and a DRB for both DL and UL);
  Marking a QoS flow ID in both a DL and an UL (marking QoS flow ID in both DL and UL packets); and/or
  Mapping reflective QoS flow to a data bearer for uplink SDAP PDUs (reflective QoS flow to DRB mapping for uplink SDAP PDUs).

In association with an SDAP layer, whether to use the header of the SDAP layer or whether to use the function of the SDAP layer may be configured for the UE via an RRC message for each PDCP layer, for each bearer, or for each logical channel. If the SDAP header is configured, a NAS reflective QoS configuration one-bit indicator (NAS reflective QoS) and an AS reflective QoS configuration one-bit indicator (AS reflective QoS) of the SDAP header may provide an indication so that the UE updates or reconfigures mapping information between a QoS flow and a data bearer in an uplink and a downlink. The SDAP header may include QoS flow ID information indicating QoS. The QoS information may be used as data processing priority information, scheduling information, or the like for supporting a smooth service.

The main functions of the NR PDCP 2-05 and 2-40 may include some of the following functions:
  Header compression and decompression: (header compression and decompression: ROHC only);
  Transfer of user data;
  Sequential transfer (in-sequence delivery of upper layer PDUs);
  Non-sequential transfer (out-of-sequence delivery of upper layer PDUs);
  Reordering (PDCP PDU reordering for reception);
  Duplicate detection (duplicate detection of lower layer SDUs);
  Retransmission (retransmission of PDCP SDUs);
  Ciphering and deciphering; and/or
  Timer-based SDU discard (timer-based SDU discard in uplink).

The reordering function of the NR PDCP device may refer to a function of sequentially reordering PDCP PDUs received from a lower layer according to a PDCP sequence number (SN), and may include a function of transferring sequentially reordered data to a higher layer, a function of immediately transferring data irrespective of a sequence, a function of recording lost PDCP PDUs after sequential recording, a function of reporting the states of lost PDCP PDUs to a transmission side, and a function of requesting retransmission of lost PDCP PDUs.

The main functions of the NR RLC 2-10 and 2-35 may include some of the following functions:
  Transfer of data (transfer of upper layer PDUs);
  Sequential transfer (in-sequence delivery of upper layer PDUs);
  Non-sequential transfer (out-of-sequence delivery of upper layer PDUs);
  ARQ (error correcting through ARQ);
  Concatenation, segmentation, and reassembly (concatenation, segmentation and reassembly of RLC SDUs);
  Re-segmentation (re-segmentation of RLC data PDUs);
  Reordering (reordering of RLC data PDUs);
  Duplicate detection;
  Error detection (protocol error detection);
  RLC SDU discard; and/or
  RLC re-establishment.

The mentioned in-sequence delivery function of the NR RLC device is a function of sequentially transferring RLC SDUs, received from a lower layer, to a higher layer. If a single original RLC SDU is divided into multiple RLC SDUs and the multiple RLC SDUs are received, the in-sequence delivery function may include a function of re-establishing and transferring the same. The in-sequence delivery function may include a function of reordering received RLC PDUs according to an RLC sequence number (SN) or a PDCP SN, a function of recording lost RLC PDUs after sequential reordering, a function of reporting the states of lost RLC PDUs to a transmission side, a function of requesting retransmission of lost RLC PDUs, a function of sequentially transferring only RLC SDUs before a lost RLC SDU, to a higher layer, if a lost RLC SDU exists, or a function of sequentially transferring all RLC SDUs, received before a predetermined timer starts, to a higher layer even though a lost RLC SDU exists, if the predetermined timer expires.

Alternatively, the in-sequence delivery function may include a function of sequentially transferring all RLC SDUs, received up to the present, to a higher layer even though a lost RLC SDU exists, if a predetermined timer expires. Also, RLC PDUs are processed in order of reception (in order of arrival, irrespective of a serial number or a sequence number), and are transmitted to the PDCP device irrespective of a sequence (out-of-sequence delivery). In the case of segments, segments, which are stored in a buffer or which are to be received in the future, are received and reconfigured as a single intact RLC PDU, are processed, and are transmitted to the PDCP device. The NR RLC layer may not include a concatenation function. In addition, the concatenation function may be performed in the NR MAC layer or may be replaced with a multiplexing function in the NR MAC layer.

The out-of-sequence delivery function of the NR RLC device is a function of immediately transferring RLC SDUs, received from a lower layer, to a higher layer irrespective of a sequence. If a single original RLC SDU is divided into multiple RLC SDUs and the multiple RLC SDUs are received, the out-of-sequence delivery function may include a function of re-establishing and transmitting the same, and a function of storing the RLC SN or PDCP SN of the received RLC PDUs, and performing sequential ordering, and recording lost RLC PDUs.

The NR MAC 2-15 and 2-30 may be connected to multiple NR RLC layers configured for a single UE, and the main functions of the NR MAC may include some of the following functions:

Mapping (mapping between logical channels and transport channels);
  Multiplexing and demultiplexing (multiplexing/demultiplexing of MAC SDUs);
  Scheduling information reporting;
  HARQ (error correcting through HARQ);
  Priority handling between logical channels (priority handling between logical channels of one UE);
  Priority handling between UEs (priority handling between UEs by means of dynamic scheduling);
  MBMS service identification;
  Transport format selection; and/or
  Padding.

The NR PHY layer 2-20 and 2-25 performs channel-coding and modulating of higher layer data to generate an OFDM symbol and transmits the OFDM symbol via a wireless channel, or performs demodulating and channel-decoding of an OFDM symbol, received via a wireless channel, and transmits the demodulated and channel-decoded OFDM symbol to a higher layer.

Figure 3:
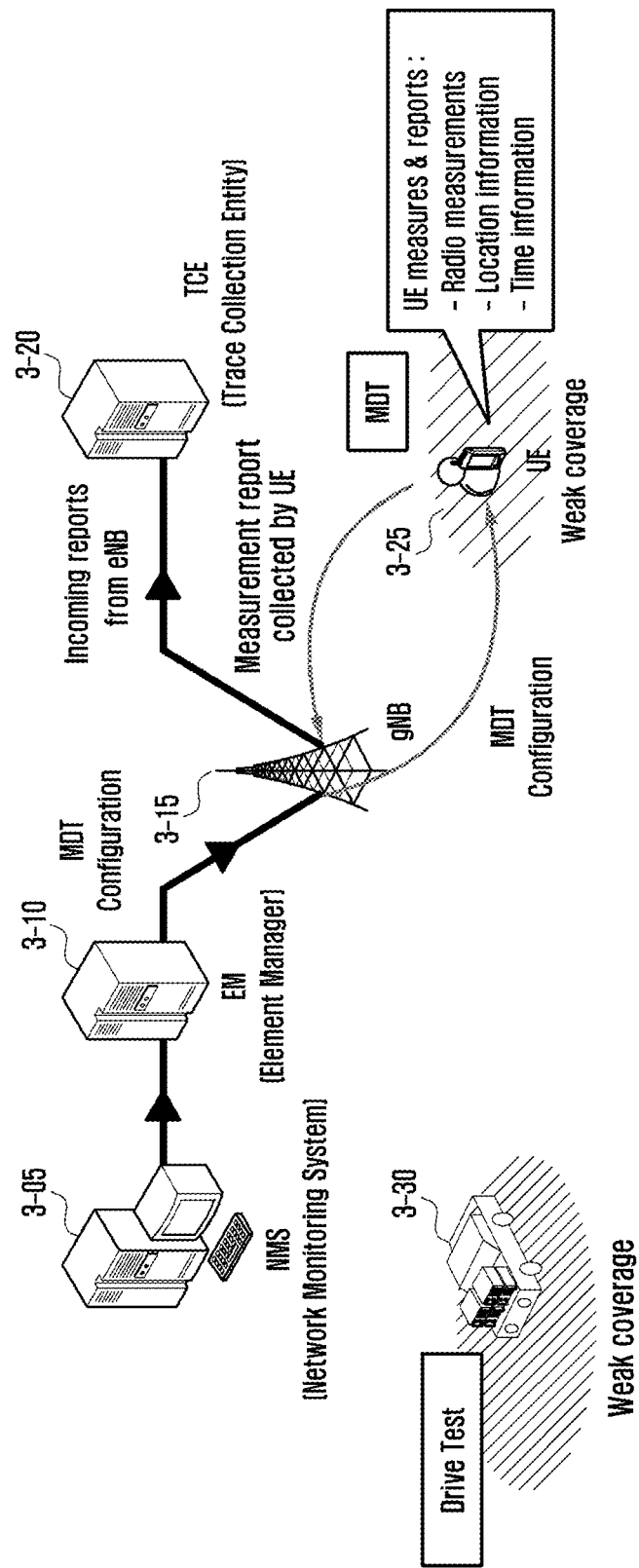
FIG. 3 is a diagram illustrating technology that collects and reports cell measurement information according to an embodiment of the present disclosure.

FIG. 3 is a diagram illustrating technology that collects and reports cell measurement information according to an embodiment of the present disclosure.

To establish or optimize a network, a mobile communication operator may measure a signal strength in a generally estimated service area, and based thereon, may dispose or readjust base stations in the service area. An operator may carry signal measurement equipment in a vehicle, and may collect cell measurement information in the service area, which requires a long time and high costs. The processor may be implemented generally using a vehicle, and is referred to as drive test 3-30. In the case of inter-cell migration, in order to support operations such as cell reselection or handover (HO), serving cell addition, and the like, a UE may have a function of measuring a signal transmitted from a base station, and reporting a measurement report. Therefore, instead of the drive test, a UE 3-25 in the service area may be utilized, which is referred to as minimization of drive test (MDT).

An operator may configure an MDT operation for predetermined UEs via various element devices 3-05, 3-10, and 3-15 of a network. The UEs may collect signal strength information from a serving cell and neighbor cells in an RRC connected mode (RRC_CONNECTED), an RRC idle mode (RRC_IDLE), or an RRC inactive mode (RRC_INACTIVE). In addition, the UEs may store various types of information such as location information, time information, signal quality information, and the like. If the UEs are in a connected mode, the stored information may be reported to a network 3-15, and the information may be transferred to a predetermined server 3-20.

The operation of the MDT may be briefly classified as an immediate MDT and a logged MDT. Hereinafter, each will be described.

According to the immediate MDT, a UE directly reports collected information to a network. Since the collected information needs to be directly reported, only a UE in an RRC connected mode is capable of performing the same. According to the immediate MDT, a radio resource management (RRM) measurement process to support operations such as handover and service cell addition, and the like may be used, and location information, time information, and the like may be additionally reported.

According to the logged MDT, a UE does not directly report collected information to a network, and store the same, and the UE reports the stored information after the UE changes into an RRC connected mode. The logged MDT may be implemented by a UE in an RRC idle mode or a UE in an RRC inactive mode which is incapable of directly reporting the collected information to a network. A UE in an RRC inactive mode which is employed in a next generation mobile communication system according to the disclosure is capable of performing the logged MDT. If a predetermined UE is in an RRC connected mode, the network may provide configuration information for performing logged MDT operation to the UE. The UE may change into an RRC idle mode or an RRC inactive mode, may collect signal strength information according to the configuration information, and may store the same. In addition, the UE may collect and store various types of information such as location information, time information, signal quality information, and the like, according to the configuration information. The RRC mode of a UE that performs immediate MDT and the RRC mode of a UE that performs logged MDT may be as shown in Table 1.

TABLE 1

| | RRC mode |
|---|---|
| Immediate MDT | RRC_CONNECTED |
| Logged MDT | RRC_IDLE, RRC_INACTIVE |

Figure 4:
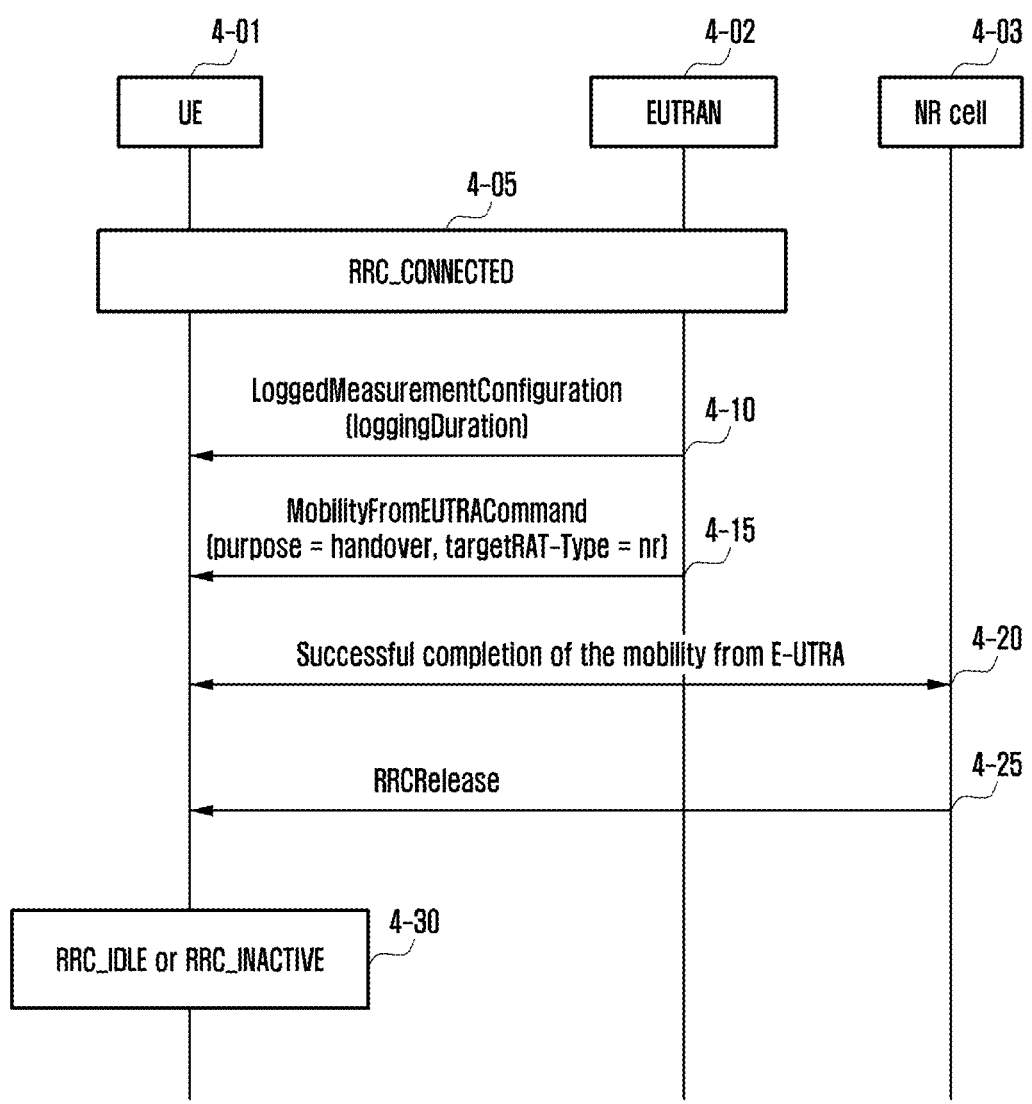
FIG. 4 is a diagram illustrating a process in which a UE performs handover according to an embodiment of the present disclosure.

FIG. 4 is a diagram illustrating a process in which a UE performs handover according to an embodiment of the present disclosure.

Particularly, 4 illustrates a process in which a UE successively performs a mobility from evolved universal terrestrial radio access (E-UTRA) procedure, and moves to an NR cell according to an embodiment of the present disclosure.

Referring to FIG. 4, a UE 4-01 sets up (or establishes) an RRC connection with an LTE base station 4-02, and may be in an RRC connected mode (RRC_CONNECTED) in operation 4-05.

In operation 4-10, the UE 4-01 in the RRC connected mode may receive a LoggedMeasurementConfiguration message from the LTE base station 4-02. The message may include configuration information used for logging a measurement result obtained in an RRC idle mode (RRC_IDLE) or an RRC inactive mode (RRC_INACTIVE) when the UE changes to the RRC idle mode or the RRC inactive mode. If the UE 4-01 in the RRC connected mode receives a LoggedMeasurementConfiguration message, the following example operations may be performed.

In one example, if timer T330 is running, stop timer T330 (stop timer T330, if running).

In one example, if stored, delete logged measurement configuration stored in VarLogMeasConfig and logged measurement information stored in VarLogMeasReport (if stored, discard the logged measurement configuration as well as the logged measurement information, i.e., release the UE variables VarLogMeasConfig and VarLogMeasReport).

In one example, if loggingDuration, loggingInterval, and areaConfiguration are included in the received LoggedMeasurementConfiguration message, store the same in VarLogMeasConfig (store the received loggingDuration, loggingInterval and areaConfiguration, if included, in VarLogMeasConfig). For reference, loggingDuration may be a T330 timer value.

In one example, if the received LoggedMeasurementConfiguration message includes plmn-IdentityList, set a registered public land mobile network (RPLMN) and public land mobile networks (PLMNs) included in received plmn-IdentityList in plmn-IdentityList included in VarLogMeasReport (if the LoggedMeasurementConfiguration message includes plmn-IdentityList, set plmn-IdentityList in VarLogMeasReport to include the RPLMN as well as the PLMNs included in plmn-IdentityList). If the received LoggedMeasurementConfiguration message does not include plmn-IdentityList, set an RPLMN in plmn-IdentityList included in VarLogMeasReport (set plmn-IdentityList in VarLogMeasReport to include the RPLMN).

In one example, store absoluteTimeInfo, traceReference, traceRecordingSessionRef, and tce-ID included in the received LoggedMeasurementConfiguration message in VarLogMeasReport (store the received absoluteTimeInfo, traceReference, traceRecordingSessionRef and tce-Id in VarLogMeasReport).

In one example, if the received LoggedMeasurementConfiguration message includes at least one of targetMBSFN-AreaList, bt-NameList, and wlan-NameList, store the same in VarLogMeasConfig (store the received targetMBSFN-AreaList, if included, bt-NameList, if included, wlan-NameList, if included, in VarLogMeasConfig).

In one example, set a timer T330 value to a loggingDuration value included in the received LoggedMeasurementConfiguration message, and operate the timer T330 (start timer T330 with the timer value set to the loggingDuration).

The LoggedMeasurementConfiguration message may include an abstract syntax notation one (ASN.1) structure as shown in Table 2.

TABLE 2

```
LoggedMeasurementConfiguration-r10 ::= SEQUENCE {
    criticalExtensions                              CHOICE {
        c1
        CHOICE {
                        loggedMeasurementConfiguration-r10
        LoggedMeasurementConfiguration-r10-IEs,
                        spare3 NULL, spare2 NULL, spare 1 NULL
        },
        criticalExtensionsFuture                    SEQUENCE
        { }
        }
    }
}
LoggedMeasurementConfiguration-r10-IEs ::= SEQUENCE {
    traceReference-r10                              TraceReference-r10,
    traceRecordingSessionRef-r10        OCTET STRING (SIZE (2)),
    tce-Id-r10                                      OCTET
    STRING (SIZE (1)),
    absoluteTimeInfo-r10                            AbsoluteTimeInfo-r10,
    areaConfiguration-r10                           AreaConfiguration-r10
```

TABLE 2-continued

```
OPTIONAL,           -- Need OR
    loggingDuration-r10                         LoggingDuration-r10,
    loggingInterval-r10                         LoggingInterval-r10,
    nonCriticalExtension
    LoggedMeasurementConfiguration-v1080-IEs    OPTIONAL
}
LoggedMeasurementConfiguration-v1080-IEs ::= SEQUENCE {
    lateNonCriticalExtension-r10    OCTET STRING
                        OPTIONAL,
    nonCriticalExtension
    LoggedMeasurementConfiguration-v1130-IEs    OPTIONAL
}
LoggedMeasurementConfiguration-v1130-IEs ::= SEQUENCE {
    plmn-IdentityList-r11                       PLMN-IdentityList3-r11
    OPTIONAL,           -- Need OR
    areaConfiguration-v1130                     AreaConfiguration-v1130
    OPTIONAL,           -- Need OR
    nonCriticalExtension
    LoggedMeasurementConfiguration-v1250-IEs    OPTIONAL
}
LoggedMeasurementConfiguration-v1250-IEs ::= SEQUENCE {
    targetMBSFN-AreaList-r12        TargetMBSFN-AreaList-r12
    OPTIONAL,           -- Need OP
    nonCriticalExtension
    LoggedMeasurementConfiguration-v1530-IEs
        OPTIONAL
}
LoggedMeasurementConfiguration-v1530-IEs ::= SEQUENCE {
    bt-NameList-r15                             BT-NameList-r15
                        OPTIONAL,               --Need OR
    wlan-NameList-r15                           WLAN-NameList-r15
                OPTIONAL,                       --Need OR
    nonCriticalExtension                        SEQUENCE { }
                OPTIONAL
}
TargetMBSFN-AreaList-r12 ::=                    SEQUENCE    (SIZE
(0..maxMBSFN-Area)) OF TargetMBSFN-Area-r12
TargetMBSFN-Area-r12 ::=                        SEQUENCE {
    mbsfn-AreaId-r12                            MBSFN-
AreaId-r12          OPTIONAL,   -- Need OR
    carrierFreq-r12                             ARFCN-
ValueEUTRA-r9,
    ...
}
```

In operation 4-15, the LTE base station 4-02 may initiate a mobility from E-UTRA procedure in order to handover the UE 4-01 in the RRC connected mode to an NR cell. That is, the LTE base station 4-02 may transmit a Mobility-FromEUTRACommand message to the UE 4-01. If the UE 4-01 receives the MobilityFromEUTRACommand message, the UE 4-01 may perform the following example operations.

In one example, if timer T310 is running, stop timer T310 (stop timer T310, if running).

In one example, if timer T312 is running, stop timer T312 (stop timer T312, if running).

In one example, if timer T316 is running, stop timer T316 and clear all the information included in VarRLF-Report (if timer T316 is running, stop timer T316 and clear the information included in VarRLF-Report, if any).

In one example, if timer T309 is running, stop timer T309 for all access categories and perform operations specified TS 36.331 (if T309 is running, stop timer T309 for all access categories, and perform the actions as specified in TS 36.331).

In one example, if handover is set as a purpose and targetRAT-Type is set to nr in the Mobility-FromEUTRACommand message (if the Mobility-FromEUTRACommand message includes the purpose set to handover and the targetRAT-Type is set to nr):

(1) a UE may regard that inter-RAT mobility to NR is initiated (consider inter-RAT mobility as initiated towards NR); or (2) the UE may access a target cell 4-03 indicated in the inter-RAT message according to TS 38.331 (access the target cell indicated in the inter-RAT message in accordance with the specification in TS 38.331).

The MobilityFromEUTRA message may have an ASN.1 structure as shown in Table 3.

TABLE 3

```
MobilityFromEUTRACommand ::=        SEQUENCE {
    rrc-TransactionIdentifier       RRC-TransactionIdentifier,
    criticalExtensions                          CHOICE {
        c1
        CHOICE{
            mobilityFromEUTRACommand-r8
        MobilityFromEUTRACommand-r8-IEs,
            mobilityFromEUTRACommand-r9
        MobilityFromEUTRACommand-r9-IEs,
```

TABLE 3-continued

```
      spare2 NULL, spare1
  NULL
    },
    criticalExtensionsFuture          SEQUENCE { }
  }
}
MobilityFromEUTRACommand-r8-IEs ::= SEQUENCE {
  cs-FallbackIndicator               BOOLEAN,
  purpose
  CHOICE{
    handover
  Handover,
    cellChangeOrder
  CellChangeOrder
  },
  nonCriticalExtension
  MobilityFromEUTRACommand-v8a0-IEs  OPTIONAL
}
MobilityFromEUTRACommand-v8a0-IEs ::= SEQUENCE {
  lateNonCriticalExtension           OCTET STRING
                                     OPTIONAL,
  nonCriticalExtension
  MobilityFromEUTRACommand-v8d0-IEs  OPTIONAL
}
MobilityFromEUTRACommand-v8d0-IEs ::= SEQUENCE {
  bandIndicator
  BandIndicatorGERAN                 OPTIONAL,    -- Cond
GERAN
  nonCriticalExtension               SEQUENCE { }
                                     OPTIONAL
}
MobilityFromEUTRACommand-r9-IEs ::= SEQUENCE {
  cs-FallbackIndicator               BOOLEAN,
  purpose
  CHOICE{
    handover
  Handover,
    cellChangeOrder
  CellChangeOrder,
    e-CSFB-r9
  E-CSFB-r9,
    ...
  },
  nonCriticalExtension
  MobilityFromEUTRACommand-v930-IEs  OPTIONAL
}
MobilityFromEUTRACommand-v930-IEs ::= SEQUENCE {
  lateNonCriticalExtension           OCTET STRING
                                     OPTIONAL,
  nonCriticalExtension
  MobilityFromEUTRACommand-v960-IEs  OPTIONAL
}
MobilityFromEUTRACommand-v960-IEs ::= SEQUENCE {
  bandIndicator                      BandIndicatorGERAN
                       OPTIONAL,     -- Cond GERAN
  nonCriticalExtension
  MobilityFromEUTRACommand-v1530-IEsOPTIONAL
}
MobilityFromEUTRACommand-v1530-IEs ::= SEQUENCE {
  smtc-r15                                         MTC-
SSB-NR-r15             OPTIONAL,                -- Need OP
  nonCriticalExtension               SEQUENCE { }
                       OPTIONAL
}
Handover ::=                         SEQUENCE {
  targetRAT-Type
  ENUMERATED {
    utra, geran, cdma2000-1XRTT, cdma2000-HRPD,
    nr, eutra, spare2, spare 1, ...},
  targetRAT-MessageContainer         OCTET STRING,
  nas-SecurityParamFromEUTRA         OCTET STRING (SIZE
(1)) OPTIONAL,       -- Cond UTRAGERANEPC
  systemInformation                                SI-OrPSI-
GERAN                  OPTIONAL     -- Cond PSHO
}
CellChangeOrder ::=                  SEQUENCE {
  t304
  ENUMERATED {
    ms100, ms200, ms500, ms1000,
    ms2000, ms4000, ms8000, ms10000-V1310},
```

TABLE 3-continued

```
targetRAT-Type                              CHOICE {
    geran
    SEQUENCE {
                            physCellId
        PhysCellIdGERAN,
                            carrierFreq
        CarrierFreqGERAN,
                            networkControlOrder
        BIT STRING (SIZE (2))   OPTIONAL,     -- Need OP
                            systemInformation
        SI-OrPSI-GERAN                  OPTIONAL     --
Need OP
        },
        ...
    }
}
SI-OrPSI-GERAN ::=                          CHOICE {
    si
    SystemInfoListGERAN,
    psi
    SystemInfoListGERAN
}
E-CSFB-r9 ::=                               SEQUENCE {
    messageContCDMA2000-1XRTT-r9            OCTET STRING
        OPTIONAL,   -- Need ON
    mobilityCDMA2000-HRPD-r9                ENUMERATED {
        handover, redirection
    }                                       OPTIONAL,    -- Need OP
    messageContCDMA2000-HRPD-r9             OCTET STRING
        OPTIONAL,            -- Cond concHO
    redirectCarrierCDMA2000-HRPD-r9         CarrierFreqCDMA2000
        OPTIONAL     -- Cond concRedir
}
```

In operation 4-20, the UE 4-01 may successfully access the target cell 4-03 and may successfully complete the mobility from an E-UTRA procedure (successful completion of the mobility from E-UTRA). That is, if the UE 4-01 successfully completes handover to the target cell 4-03 (e.g., if the UE successfully completes a random access process procedure with a target cell), and performs the following operations according to a condition, it is identified that the mobility from E-UTRA procedure is successfully completed.

In one example of Condition 1, a UE may be connected to a 5G core network (5GC) before receiving MobilityFromEUTRACommand in operation 4-15 (i.e., E-UTRA/5GC, E-UTRA connected to 5GC) in operation 4-15, and targetRAT-Type may be set to nr in the received MobilityFromEUTRACommand message in operation 4-15.

In such example (e.g., action 1):
(1) the UE resets a MAC layer (reset MAC);
(2) the UE stops all timers that are currently running (stop all timers that are running);
(3) if ran-NotificationAreaInfo is stored, the UE may release ran-NotificationAreaInfo (release ran-NotificationAreaInfo, if stored);
(4) if AS security context including KRRCenc key, KRRCint key, KUPint key, and KUPenc key is stored, the UE may release all AS security contexts including KRRCenc key, KRRCint key, KUPint key, and KUPenc key (release the AS security context including the KRRCenc key, the KRRCint, the KUPint key and the KUPenc key, if stored); and/or
(5) release all radio resources that may include an RLC entity, MAC configuration, and a related PDCP entity and SDAP entity for all established radio bearers (release all radio resources, including release of the RLC entity, the MAC configuration and the associated PDCP entity and SDAP entity for all established RBs). In action 2 described below, PDCP and SDAP configurations set in a source RAT before handover is performed may not be released.

In one example of Condition 2, a UE may be connected to EPC before receiving MobilityFromEUTRACommand in operation 4-15 (i.e., E-UTRA/EPC), and targetRAT-Type may be set to nr in MobilityFromEUTRACommand message received in 4-15.

In such example (e.g., action 2), the UE may perform an operation upon leaving RRC_CONNECTED as stated in TS 36.331 with release cause "other" (perform the action upon leaving RRC_CONNECTED as specified in TS 36.331 with release cause "other"). In this instance, although timer T330 is running, the UE does not stop timer T330.

If condition 1 is satisfied and action 1 is performed, the UE according to an embodiment of the present disclosure may stop all timers that are running including timer T330. Therefore, if the NR cell 4-03 transmits an RRC connection release message (RRCRelease) to the UE 4-01 in operation 4-25, so as to shift (change) to an RRC idle mode (RRC_IDLE) or an RRC inactive mode (RRC_INACTIVE) in operation 4-30, the UE 4-01 may not perform logging according to the LoggedMeasurementConfiguration message received in operation 4-10. Therefore, although an RRC idle mode or RRC inactive mode UE shifts to an RRC connected mode afterward, a base station may be incapable of receiving a measurement result that the UE logs from the UE, and thus, a network may be inefficiently operated, which is a drawback.

Conversely, in the case in which condition 2 is satisfied and action 2 is performed, the UE may not stop if timer T330 is running. Therefore, if the NR cell 4-03 transmits an RRC connection release message (RRCRelease) to the UE 4-01 in operation 4-25, so as to shift (change) to an RRC idle mode (RRC_IDLE) or an RRC inactive mode (RRC_INACTIVE)

in operation 4-30, the UE 4-01 may perform logging according to the LoggedMeasurementConfiguration message received in operation 4-10.

In FIG. 4, operations 4-05 to 4-30 may be partially omitted or may be performed in parallel.

Figure 5:
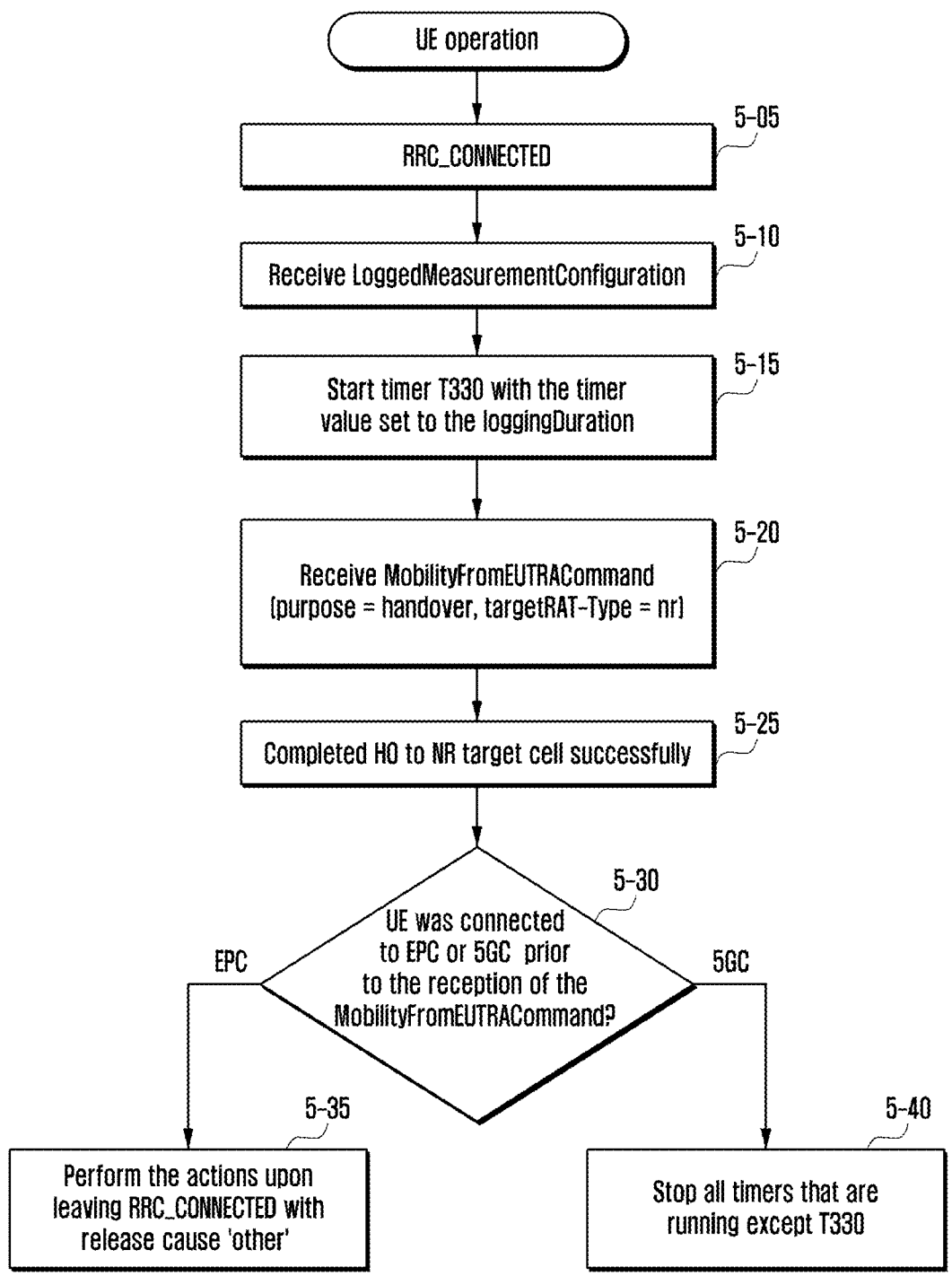
FIG. 5 is a diagram illustrating a process in which a UE performs handover according to an embodiment of the present disclosure.

FIG. 5 is a diagram illustrating a process in which a UE performs handover according to an embodiment of the present disclosure.

Particularly, FIG. 5 is a diagram illustrating a process in which a UE successfully performs a mobility from E-UTRA procedure and moves to an NR cell according to an embodiment of the disclosure.

According to an embodiment of the disclosure, there is provided a method in which a UE that successfully performs inter-RAT handover processes timer T330.

For example, if T330 timer is running, the UE that successfully performs inter-RAT handover may not stop timer T330 and may continuously operate timer T330.

Referring to FIG. 5, the UE may establish an RRC connection to an LTE base station, and may be in an RRC connected mode (RRC_CONNECTED) in operation 5-05.

In operation 5-10, the UE may receive a LoggedMeasurementConfiguration message from the LTE base station.

In operation 5-15, the UE may set a T330 timer value to a loggingDuration value included in the LoggedMeasurementConfiguration message received in operation 5-10, and may operate timer T330.

In operation 5-20, the UE may receive a MobilityFromEUTRACommand message from the LTE base station. The UE may identify that a purpose is set to handover and targetRAT-Type is set to nr in the MobilityFromEUTRACommand message, and may identity that handover to an NR cell needs to be performed.

In operation 5-25, the UE may successfully perform handover to the NR cell. For example, if a predetermined RRC message indicating that a random access procedure with the NR cell is successfully performed or handover to the NR cell is completed is transmitted, the UE may determine that the handover is successfully performed.

If the UE successfully completes handover to the NR cell, the UE determines whether the UE was connected to 5GC (E-UTRA/5GC) or was connected to an EPC (E-UTRA/EPC, E-UTRA connected to EPC) before receiving MobilityFromEUTRACommand in operation 5-20, in operation 5-30.

If the UE was connected to an EPC before receiving MobilityFromEUTRACommand, the UE may set an operation to be performed when leaving RRC_CONNECTED to release cause "other" as stated in TS 36.331 in operation 5-35. In this instance, although timer T330 is running, the UE does not stop the same. Accordingly, although the UE that sets up an RRC connection to the NR cell shifts to an RRC idle mode (RRC_IDLE) or an RRC inactive mode (RRC_INACTIVE) afterward, timer T330 is continuously running, and thus the UE may perform a logging operation according to the LoggedMeasurementConfiguration message received in operation 5-10.

If the UE was connected to 5GC before receiving MobilityFromEUTRACommand, the UE according to an embodiment of the disclosure may stop the remaining timers excluding timer T330 among all the timers that are currently running in operation 5-40. Although a UE stops timer T330 in action 1 in the above-described embodiment, a UE in the embodiment does not stop but continuously operates timer T330 if timer T330 is running in operation 5-40. Accordingly, although the RRC connection to the NR cell to which handover is successfully performed is released and the UE shifts to an RRC idle mode (RRC_IDLE) or an RRC inactive mode (RRC_INACTIVE) afterward, timer T330 is continuously running, and thus the UE may perform a logging operation according to the LoggedMeasurementConfiguration message received in operation 5-10.

In FIG. 5, operations 5-05 to 5-40 may be partially omitted or may be performed in parallel.

Figure 6:
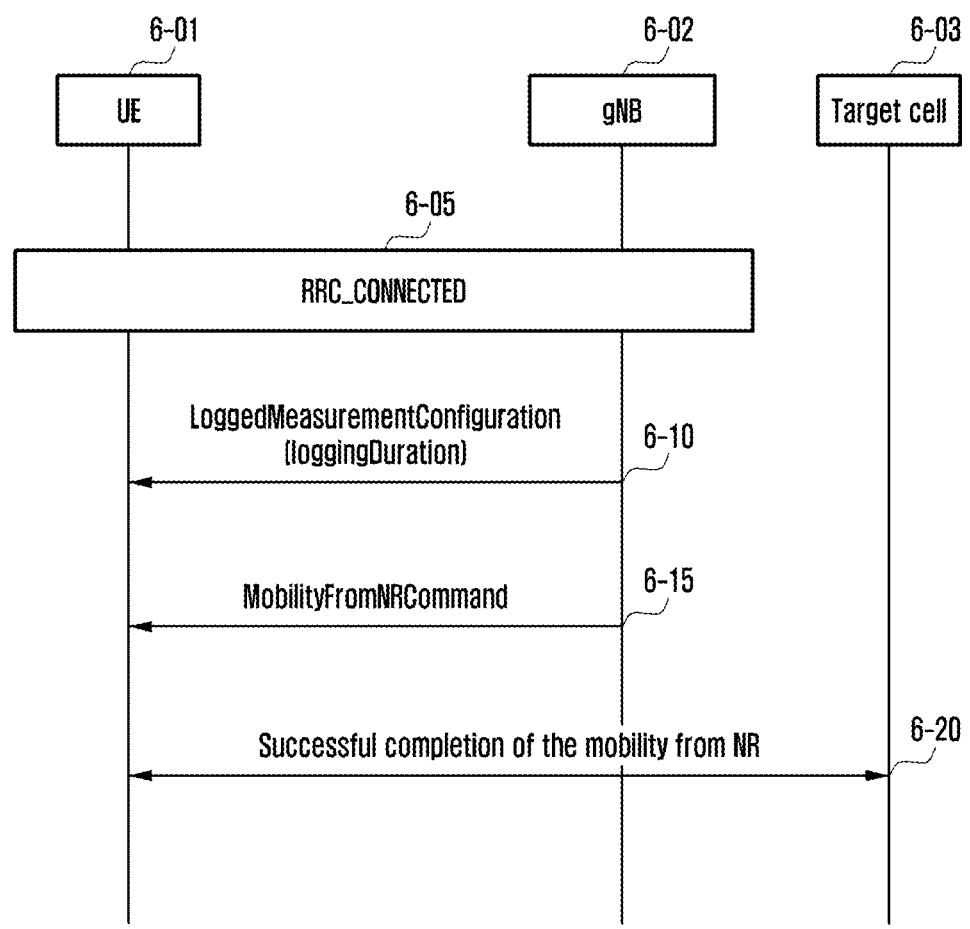
FIG. 6 is a diagram illustrating a process in which a UE performs handover according to an embodiment of the present disclosure.

FIG. 6 is a diagram illustrating a process in which a UE performs handover according to an embodiment of the present disclosure.

Particularly, FIG. 6 is a diagram illustrating a process in which a UE according to an embodiment of the disclosure successfully performs a mobility from NR procedure and moves to a target cell.

Referring to FIG. 6, a UE 6-01 sets up (or establishes) an RRC connection with an NR base station 6-02, and may be in an RRC connected mode (RRC_CONNECTED) in operation 6-05.

In operation 6-10, the UE 6-01 in the RRC connected mode may receive a LoggedMeasurementConfiguration message from the NR base station 6-02. The message may include configuration information used for logging a measurement result obtained in an RRC idle mode (RRC_IDLE) or an RRC inactive mode (RRC_INACTIVE) when the UE changes to the RRC idle mode or the RRC inactive mode. If receiving the LoggedMeasurementConfiguration message, the UE 6-01 in the RRC connected mode may perform the following example operations.

In one example, if timer T330 is running, the UE stops timer T330 (stop timer T330, if running).

In one example, if stored, the UE deletes logged measurement configuration stored in VarLogMeasConfig and logged measurement information stored in VarLogMeasReport (if stored, discard the logged measurement configuration as well as the logged measurement information, i.e., release the UE variables VarLogMeasConfig and VarLogMeasReport).

In one example, if loggingDuration, reportType, and areaConfiguration are included in the received LoggedMeasurementConfiguration message, the UE stores the same in VarLogMeasConfig (store the received loggingDuration, reportType and areaConfiguration, if included, in VarLogMeasConfig). For reference, loggingDuration may be a T330 timer value.

In one example, if the received LoggedMeasurementConfiguration message includes plmn-IdentityList, the UE sets an RPLMN and PLMNs included in the received plmn-IdentityList in the plmn-IdentityList included in VarLogMeasReport (if the LoggedMeasurementConfiguration message includes plmn-IdentityList, set plmn-IdentityList in VarLogMeasReport to include the RPLMN as well as the PLMNs included in plmn-IdentityList). If the received LoggedMeasurementConfiguration message does not include plmn-IdentityList, set an RPLMN in plmn-IdentityList included in VarLogMeasReport (set plmn-IdentityList in VarLogMeasReport to include the RPLMN).

In one example, the UE stores absoluteTimeInfo, traceReference, traceRecordingSessionRef, and tce-ID included in the received LoggedMeasurementConfiguration message in VarLogMeasReport (store the received absoluteTimeInfo, traceReference, traceRecordingSessionRef and tee-Id in VarLogMeasReport).

In one example, if the received LoggedMeasurementConfiguration message includes at least one of bt-NameList, wlan-NameList, or sensor-NameList, the UE stores the same in VarLogMeasConfig (store the received bt-NameList, if included, wlan-NameList, if included, sensor-NameList, if included, in VarLogMeasConfig).

In one example, set a T330 timer value to a loggingDuration value included in the received LoggedMeasurementConfiguration message, and the UE may operate the timer T330 (start timer T330 with the timer value set to the loggingDuration).

The LoggedMeasurementConfiguration message may include an ASN.1 structure as shown in Table 4.

In one example, if timer T316 is running, the UE stops timer T316 and cancels all the information included in VarRLF-Report (if timer T316 is running, stop timer T316 and clear the information included in VarRLF-Report, if any).

In one example, if timer T309 is running, the UE stops timer T309 for all access categories and perform operations

TABLE 4

```
LoggedMeasurementConfiguration-r16 ::= SEQUENCE {
    criticalExtensions          CHOICE {
        loggedMeasurementConfiguration-r16    LoggedMeasurementConfiguration-r16-IEs,
        criticalExtensionsFuture     SEQUENCE { }
    }
}
LoggedMeasurementConfiguration-r16-IEs ::= SEQUENCE {
    traceReference-r16           TraceReference-r16,
    traceRecordingSessionRef-r16    OCTET STRING (SIZE (2)),
    tce-Id-r16                   OCTET STRING (SIZE (1)),
    absoluteTimeInfo-r16         AbsoluteTimeInfo-r16,
    areaConfiguration-r16        AreaConfiguration-r16         OPTIONAL,
--Need R
    plmn-IdentityList-r16        PLMN-IdentityList2-r16        OPTIONAL,
--Need R
    bt-NameList-r16              SetupRelease {BT-NameList-r16}    OPTIONAL,
--Need M
    wlan-NameList-r16               SetupRelease {WLAN-NameList-r16}
OPTIONAL, --Need M
    sensor-NameList-r16             SetupRelease {Sensor-NameList-r16}
OPTIONAL, --Need M
    loggingDuration-r16          LoggingDuration-r16,
    reportType                   CHOICE {
        periodical               LoggedPeriodicalReportConfig-r16,
        eventTriggered           LoggedEventTriggerConfig-r16,
        ...
    },
    lateNonCriticalExtension     OCTET STRING                  OPTIONAL,
    nonCriticalExtension         SEQUENCE { }                  OPTIONAL
}
LoggedPeriodicalReportConfig-r16 ::=   SEQUENCE {
    loggingInterval-r16          LoggingInterval-r16,
    ...
}
LoggedEventTriggerConfig-r16 ::=   SEQUENCE {
    eventType-r16                EventType-r16,
    loggingInterval-r16          LoggingInterval-r16,
    ...
}
EventType-r16 ::= CHOICE {
    outOfCoverage   NULL,
    eventL1      SEQUENCE {
        l1-Threshold   MeasTriggerQuantity,
        hysteresis   Hysteresis,
        timeToTrigger   TimeToTrigger
    },
    ...
}
```

In operation 6-15, the NR base station 6-02 may initiate a mobility from NR procedure in order to handover the UE 6-01 in an RRC connected mode to a target cell 6-03. Here, the target cell 6-03 may be at least one of E-UTRA/EPC, E-UTRA/5GC, or universal terrestrial radio access-frequency division duplex (UTRA-FDD). The NR base station 6-02 may transmit a MobilityFromNRCommand message to the UE 6-01. If receiving the MobilityFromNRCommand message, the UE 6-01 may perform the following example operations.

In one example, if timer T310 is running, the UE stops timer T310 (stop timer T330, if running).

In one example, if timer T312 is running, the UE stops timer T312 (stop timer T312, if running).

specified in TS 38.331 (if T309 is running, stop timer T309 for all access categories, and perform the actions as specified in TS 38.331).

In one example, if targetRAT-Type is set to eutra (if the targetRAT-Type is set to eutra):

(1) a UE may regard that inter-RAT mobility to E-UTRA is initiated (consider inter-RAT mobility as initiated towards E-UTRA); and/or (2) If nas-SecurityParamFromNR is included, the UE forwards the same to a higher layer (forward the nas-SecurityParamFromNR to the upper layers, if included).

In one example, if targetRAT-Type is set to utra-fdd (if the targerRAT-Type is set to utra-fdd):
(1) a UE may regard that inter-RAT mobility to UTRA-FDD is initiated (consider inter-RAT mobility as initiated towards UTRA-FDD); and/or
(2) if nas-SecurityParamFromNR is included, the UE forwards the same to a higher layer (forward the nas-SecurityParamFromNR to the upper layers, if included).

The MobilityFromNR message may have an ASN.1 structure as shown in Table 5.

TABLE 5

```
MobilityFromNRCommand ::=       SEQUENCE {
   rrc-TransactionIdentifier       RRC-TransactionIdentifier,
   criticalExtensions              CHOICE {
      mobilityFromNRCommand           MobilityFromNRCommand-IEs,
      criticalExtensionsFuture        SEQUENCE { }
   }
}
MobilityFromNRCommand-IEs ::=    SEQUENCE {
   targetRAT-Type                   ENUMERATED { eutra, utra-fdd-v1610, spare2, spare1, ...},
   targetRAT-MessageContainer       OCTET STRING,
   nas-SecurityParamFromNR                             OCTET STRING
OPTIONAL,  -- CondHO-ToEPCUTRAN
   lateNonCriticalExtension                            OCTET STRING
OPTIONAL,
   nonCriticalExtension             MobilityFromNRCommand-v1610-IEs
OPTIONAL
}
MobilityFromNRCommand-v1610-IEs ::= SEQUENCE {
   voiceFallbackIndication-r16                         ENUMERATED  {true}
OPTIONAL, -- Need N
   nonCriticalExtension             SEQUENCE { }       OPTIONAL
}
```

In operation 6-20, the UE 6-01 may successfully access the target cell 6-03 and may successfully complete the mobility from NR procedure (successful completion of the mobility from NR). That is, if the UE 6-01 successfully completes handover to the target cell 6-03 (e.g., if the UE successfully completes a random access process procedure with the target cell), and performs the following example operations at the source side, it is identified that the mobility from NR procedure is successfully completed.

In one example, the UE resets a MAC layer (reset MAC).

In one example, the UE stops the remaining timers excluding timer T400 and timer T330 among all timer that are currently running (stop all timers that are running except T330 and T400). In an embodiment of the disclosure, the UE does not stop timer T330.

In one example, if ran-NotificationAreaInfo is stored, the UE may release the ran-NotificationAreaInfo (release ran-NotificationAreaInfo, if stored).

In one example, if AS security context including KRR-Cenc key, KRRCint key, KUPint key, and KUPenc key is stored, the UE may release all AS security contexts including KRRCenc key, KRRCint key, KUPint key, and KUPenc key (release the AS security context including the KRRCenc key, the KRRCint, the KUPint key and the KUPenc key, if stored).

In one example, the UE may clear a PDCP entity and an SDAP entity for all established radio resources (release the associated PDCP entity and SDAP entity for all established RBs). For reference, PDCP and SDAP configurations set in a source RAT before HO is performed may not be released.

In one example, if a targetRAT-Type is set to utra-fdd or targerRAT-Type is set to eutra, and nas-SecurityParam-FromNR is included, the UE reports, to higher layers, that RRC connection is released together with release cause "other" (if the targetRAT-Type is set to utra-fdd or if the targetRAT-Type is set to eutra and the nas-SecurityParamFromNR is included, indicate the release of the RRC connection to upper layers together with the release cause "other").

In FIG. 6, operations 6-05 to 6-20 may be partially omitted or may be performed in parallel.

According to above-described embodiments, if a UE successfully completes inter-RAT handover (including handover from an LTE base station to an NR cell or handover from an NR cell to a target cell), the UE does not stop but continuously operate timer T330. Accordingly, although the UE shifts to an RRC idle mode or an RRC inactive mode, the UE may perform a logging operation according to a LoggedMeasurementConfiguration message received from the base station.

If the UE fails to perform an inter-RAT handover or an intra-RAT handover, the UE may determine the content of a radio link failure (RLF) report. For example, the UE may store handover failure information in the content of the RLF report. Hereinafter, detailed descriptions thereof will be provided with reference to FIG. 7.

Figure 7:
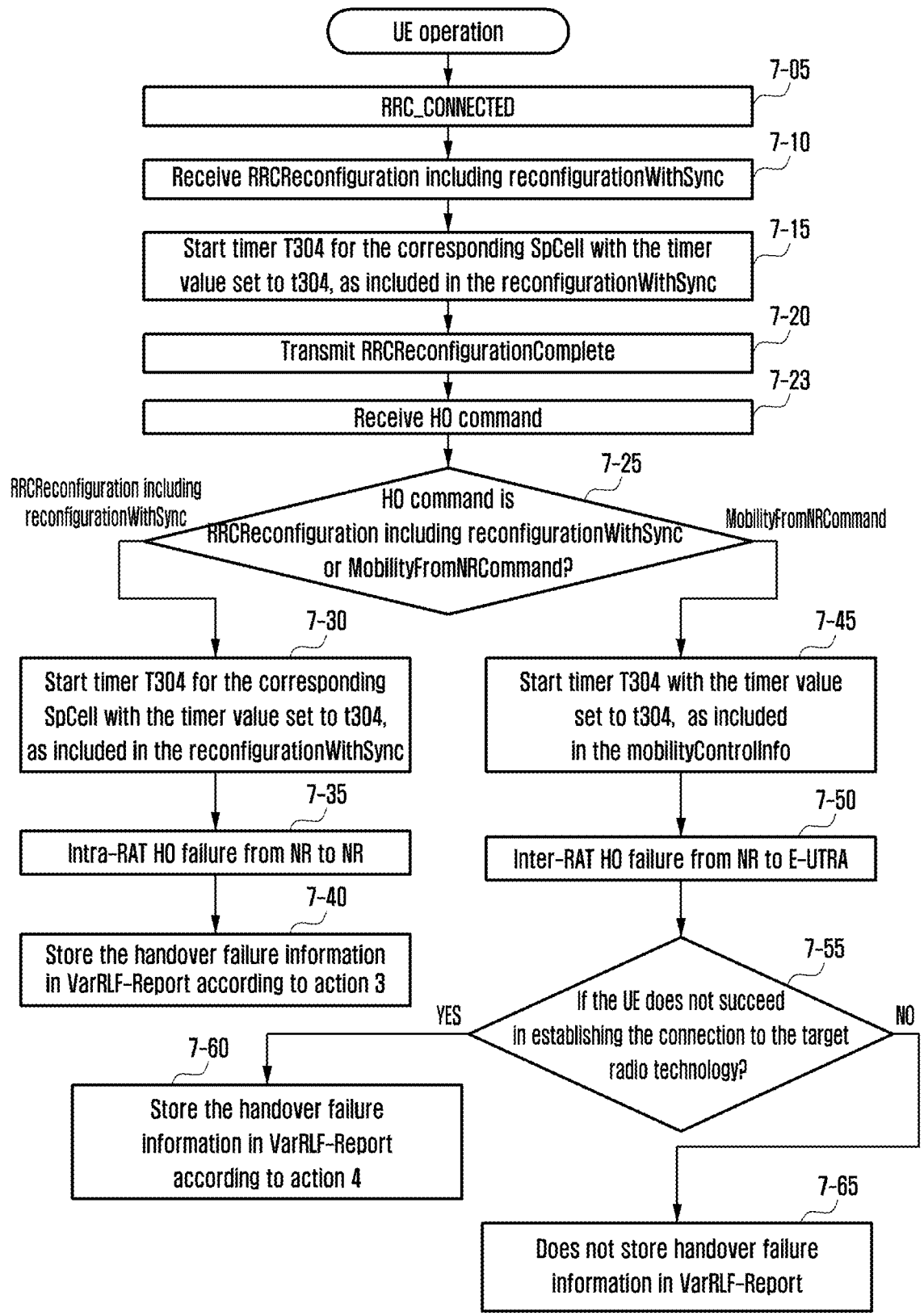
FIG. 7 is a diagram illustrating a process of storing handover failure information when a UE fails to perform handover according to an embodiment of the present disclosure.

FIG. 7 is a diagram illustrating a process of storing handover failure information when a UE fails to perform handover according to an embodiment of the present disclosure.

Referring to FIG. 7, the UE may establish an RRC connection to an NR base station, and may be in an RRC connected mode (RRC_CONNECTED) in operation 7-05.

In operation 7-10, the UE may receive an RRCReconfiguration message including reconfigurationWithSync from the NR base station.

In operation 7-15, the UE may operate timer T304 for a corresponding SpCell using a t304 timer value included in reconfigurationWithSync (start timer T304 for the corresponding SpCell with the timer value set to t304, as included in the reconfigurationWithSync). If frequencyInfoDL is included in reconfigurationWithSync, a cell on a synchronization signal block (SSB) frequency indicated by frequencyinfoDL with a physical cell identity indicated by physCellId may be regarded as a target SpCell (if the frequencyInfoDL is included, consider the target SpCell to be one on the SSB frequency indicated by the frequencyInfoDL with a physical cell identity indicated by the physCellId). Otherwise (if frequencyInfoDL is not included in reconfigurationWithSync), a cell on an SSB frequency of a source SpCell with a physical cell identity indicated by physCellId may be regarded as a target SpCell (else, consider the target SpCell to be one on the SSB frequency of the source SpCell with a physical cell identity indicated by the physCellId).

In operation 7-20, the UE successfully may perform a reconfiguration with sync (i.e., handover) and may transmit an RRCReconfigurationComplete message to the target SpCell.

In operation 7-23, the UE may receive a handover command (HO Command) from the NR base station.

If the UE determines that the HO command received in operation 7-23 is RRCReconfiguration including reconfigurationWithSync in operation 7-25, the UE may operate timer T304 for the corresponding SpCell using a t304 timer value included in reconfigurationWithSync in operation 7-30.

In operation 7-35, the UE may identify that intra-RAT handover (handover from an NR cell to the NR cell) fails due to a predetermined reason. The predetermined reason may be the case in which timer T304 operated in operation 7-30 expires.

In operation 7-40, the UE may store handover failure information in VarRLF-Report. The UE may perform action 3 described below and may store handover failure information in VarRLF-Report.

In one example (e.g., Action 3):

(1) the UE deletes information in VarRLF-Report (clear the information included in VarRLF-Report, if any);

(2) the UE sets plmn-IdentityList to include the list of stored EPLMNs and RPLM (set the plmn-IdentityList to include the list of EPLMNs stored by the UE (i.e., includes the RPLMN));

(3) the UE stores measurement values of a source PCell and measurement values of neighboring cells;

(4) the UE sets c-RNTI to C-RNTI used in the source PCell (set the c-RNTI to the C-RNTI used in the source PCell (in case HO failure));

(5) the UE sets connectionFailureType to hof, (6) the UE sets nrFailedPCellId in failedPCellId to a global cell identity and tracing area code, if available, and otherwise, set nrFailedPCellId in failedPCellId to the physical cell identity and the carrier frequency of a target PCell to which handover fails (set the nrFailedPCellId in failedPCellId to the global cell identity and tracking area code, if available, and otherwise to the physical cell identity and carrier frequency of the target PCell of the failed handover);

(7) the UE sets nrPreviousCell of previousPCellId to the global cell identity and tracking area code of the PCell that transmits the HO command message (RRCReconfiguration including reconfigurationWithSync) in operation 7-23 (include nrPreviousCell in previousPCellId and set it to the global cell identity and tracking area code of the PCell where the last RRCReconfiguration message including reconfigurationWithSync was received) In the disclosure, a global cell identity refers to the following:

TABLE 6

```
CGI-Info-Logging-r16 ::=    SEQUENCE {
    plmn-Identity-r16           PLMN-Identity,
    cellIdentity-r16            CellIdentity,
    trackingAreaCode-r16        Tracking AreaCode       OPTIONAL
}
-- TAG-CGI-INFO-LOGGING-STOP
-- ASN1STOP
```

| CGI-Info-Logging field descriptions |
|---|
| cellIdentity |
| Unambiguously identify a cell within the context of the PLMN. It belongs the first PLMN-IdentityInfo IE of PLMN-IdentityInfoList in SIB1. |
| plmn-Identity |
| Identifies the PLMN of the cell for the reported cellIdentity: the first PLMN entry of plmn-IdentityList (in SIB1) in the instance of PLMN-IdentityInfoList that contained the reported cellIdentity. |
| trackingAreaCode |
| Indicates Tracking Area Code to which the cell indicated by cellIdentity field belongs. |

(8) the UE sets timeConnFailure to the period of time elapsing from the point in time of reception of the HO command message (i.e., RRCReconfiguration including reconfigurationWithSync) received in operation 7-23 (set the timeConnFailure to the elapsed time since reception of the last RRCReconfiguration message including the reconfigurationWithSync);

(9) the UE includes information related to random access in ra-InformationCommon In this instance, information related to random access may be included in ra-InformationCommon according to TS 38.331, and for example, ra-InformationCommon may have a structure as shown in Table 7:

TABLE 7

```
RA-InformationCommon-r16 ::=        SEQUENCE {
   absoluteFrequencyPointA-r16        ARFCN-ValueNR,
   locationAndBandwidth-r16           INTEGER (0..37949),
   subcarrierSpacing-r16              SubcarrierSpacing,
   msg1-FrequencyStart-r16            INTEGER (0..maxNrofPhysicalResourceBlocks-
1)   OPTIONAL,
   msg1-FrequencyStartCFRA-r16                                INTEGER
(0..maxNrofPhysicalResourceBlocks-1)   OPTIONAL,
   msg1-SubcarrierSpacing-r16         SubcarrierSpacing      OPTIONAL,
   msg1-SubcarrierSpacingCFRA-r16                            SubcarrierSpacing
OPTIONAL,
   msg1-FDM-r16                       ENUMERATED {one, two, four, eight}
OPTIONAL,
   msg1-FDMCFRA-r16                   ENUMERATED {one, two, four, eight}
OPTIONAL,
   perRAInfoList-r16                  PerRAInfoList-r16
};
```

(10) if location information is present, the UE sets contents of locationInfo.

If the UE determines that the HO Command received in operation 7-23 is MobilityFromNRCommand in operation 7-25, the UE may operate timer T304 using a t304 timer value included in mobilityControlInfo in operation 7-45.

In operation 7-50, the UE may identify that inter-RAT handover (handover from an NR cell to an E-UTRA cell) fails due to a predetermined reason.

In operation 7-55, the UE may determine whether the inter-RAT handover failure (i.e., mobility from NR failure) in operation 7-50 is caused due to failure of connection to target radio access technology.

If it is determined that the mobility from NR failure occurs since connection to the target radio access technology fails in operation 7-55, and a radio link failure report is supported for inter-RAT mobility robustness optimization (MRO) EUTRA, the UE may store handover failure information in VarRLF-Report in operation 7-60. The UE may perform action 4 described below and may store handover failure information in VarRLF-Report.

In one example (e.g., Action 4):
(1) the UE deletes information in VarRLF-Report (clear the information included in VarRLF-Report, if any);
(2) the UE sets plmn-IdentityList to include the list of stored EPLMNs and an RPLM (set the plmn-IdentityList to include the list of EPLMNs stored by the UE (i.e., includes the RPLMN));
(3) the UE stores measurement values of a source PCell and measurement values of neighboring cells;
(4) the UE sets c-RNTI to C-RNTI used in the source PCell (set the c-RNTI to the C-RNTI used in the source PCell (in case HO failure));
(5) the UE sets connectionFailureType to hof;
(6) the UE sets eutraFailedPCellId in failedPCellId to a global cell identity and tracing area code, if available, and otherwise, set eutraFailedPCellId in failedPCellId to the physical cell identity and the carrier frequency of a target PCell to which handover fails (set the eutraFailedPCellId in failedPCellId to the global cell identity and tracking area code, if available, and otherwise to the physical cell identity and carrier frequency of the target PCell of the failed handover). For reference, in the disclosure, a global cell identity refers to the following:

TABLE 8

```
eutraFailedPCellId-r16          CHOICE {
   cellGlobalId-r16                     CGI-InfoEUTRALogging,
   pci-arfcn-r16                        SEQUENCE {
      physCellId-r16                       EUTRA-PhysCellId,
      carrierFreq-r16                      ARFCN-ValueEUTRA
   }
}
CGI-InfoEUTRALogging ::=         SEQUENCE {
   plmn-Identity-eutra-5gc           PLMN-Identity           OPTIONAL,
   trackingAreaCode-eutra-5gc        TrackingAreaCode        OPTIONAL,
   cellIdentity-eutra-5gc            BIT STRING (SIZE (28))  OPTIONAL,
   plmn-Identity-eutra-epc           PLMN-Identity           OPTIONAL,
   trackingAreaCode-eutra-epc                                BIT  STRING  (SIZE  (16))
OPTIONAL,
   cellIdentity-eutra-epc            BIT STRING (SIZE (28))  OPTIONAL
}
-- TAG-CGI-INFOEUTRALOGGING-STOP
-- ASN1STOP
```

| CGI-InfoEUTRALogging field descriptions |
|---|
| cellIdentity-eutra-epc, cellIdentity-eutra-5GC |
| Unambiguously identify a cell within the context of the PLMN. It belongs the first PLMN entry of plmn-IdentityList (when connected to EPC) or of plmn-IdentityList-r15 (when connected to 5GC) in SystemInformationBlockType1. |

TABLE 8-continued plmn-Identity-eutra-epc, plmn-Identity-eutra-5GC

Identifies the PLMN of the cell for the reported cellIdentity: the first PLMN entry of plmn-IdentityList (when connected to EPC) or of plmn-IdentityList-r15 (when connected to 5GC) in SystemInformationBlockType1 that contained the reported cellIdentity.
trackingAreaCode-eutra-epc, trackingAreaCode-eutra-5gc Indicates Tracking Area Code to which the cell indicated by cellIdentity-eutra-epc, cellIdentity-eutra-5GC belongs.

(7) the UE sets nrPreviousCell of previousPCellId to the global cell identity and tracking area code of the PCell that transmits the HO command message (RRCReconfiguration including reconfigurationWithSync) in operation 7-10 (include nrPreviousCell in previousPCellId and set it to the global cell identity and tracking area code of the PCell where the last RRCReconfiguration message including reconfigurationWithSync was received);

(8) the UE sets timeConnFailure to the period of time elapsing from the point in time of reception of the HO command message (i.e., RRCReconfiguration including reconfigurationWithSync) received in operation 7-10 (set the timeConnFailure to the elapsed time since reception of the last RRCReconfiguration message including the reconfigurationWithSync); and/or (9) the UE includes information related to random access in ra-InformationCommon In this instance, information related to random access may be included in ra-InformationCommon according to TS 38.331, and for example, ra-InformationCommon may have a structure as shown in Table 9.

TABLE 9

```
RA-InformationCommon-r16 ::=      SEQUENCE {
    absoluteFrequencyPointA-r16      ARFCN-ValueNR,
    locationAndBandwidth-r16         INTEGER (0..37949),
    subcarrierSpacing-r16            SubcarrierSpacing,
    msg1-FrequencyStart-r16          INTEGER (0..maxNrofPhysicalResourceBlocks–
1) OPTIONAL,
    msg1-FrequencyStartCFRA-r16                              INTEGER
(0..maxNrofPhysicalResourceBlocks–1) OPTIONAL,
    msg1-SubcarrierSpacing-r16     SubcarrierSpacing        OPTIONAL,
    msg1-SubcarrierSpacingCFRA-r16                          SubcarrierSpacing
OPTIONAL,
    msg1-FDM-r16                   ENUMERATED {one, two, four, eight}
OPTIONAL,
    msg1-FDMCFRA-r16               ENUMERATED {one, two, four, eight}
OPTIONAL,
    perRAInfoList-r16              PerRAInfoList-r16
}
```

In the disclosure, supporting a radio link failure report for inter-RAT MRO EUTRA may refer to the following.

TABLE 10

Radio Link Failure Report for inter-RAT MRO EUTRA
Indicates whether the UE supports:
Include EUTRA CGI and associated TAC, if available, and otherwise to include the physical cell identity and carrier frequency of the target PCell of the failed handover as failedPCellId in RLF-Report upon request from the network as specified in TS 38.331.
Include EUTRA CGI and associated TAC as previousPCellId in RLF-Report as specified in TS 38.331.

TABLE 10-continued

Include eutraReconnectCellId in reconnectCellId in the RLF-Report as specified in TS 38.331 upon UE has radio link failure or handover failure and successfully re-connected to an E-UTRA cell.

If the above described action 4 is performed, nrPreviousCell of previousPCellId may be set to the global identity and tracking area code of the PCell that transmits the HO command message (RRCReconfiguration including reconfigurationWithSync) in operation 7-10 and may be stored in VarRLF-Report, and this may be different from the PCell in operation 7-23. Since the UE performs handover in operation 7-10, 7-15, and 7-20, and thus, the PCell in operation 7-10 and the PCell in operation 7-23 may be different PCells.

In addition, timeConnFailure may be set to the period of time elapsing from the point in time of reception of the HO command message (RRCReconfiguration including reconfigurationWithSync) in operation 7-10 and may be stored in VarRLF-Report. Accordingly, timeConnFailure may be set to a longer period of time than the period of time actually elapsing from the reception of the HO command message in operation 7-23. In this instance, wrong time information may be reported to a base station. In addition, ra-InformationCommon which is information related to random access may be information related to random access to an NR cell. The UE performs random access to E-UTRA cell via handover, and thus the UE may set ra-InformationCommon to wrong information or random information.

If mobility from NR failure occurs not by the failure of connection to target radio access technology in operation 7-55, but occurs due to the following condition, the UE may not store handover failure information in VarRLF-Report in operation 7-65.

Condition:
(1) if the UE is incapable of complying with configuration included in MobilityFromNRCommand (UE is unable to comply with any part of the configuration included in the MobilityFromNRCommand) or
(2) if a protocol error occurs in inter RAT information included in MobilityFromNRCommand, and the UE fails a procedure according to the specification applicable to a target RAT (there is a protocol error in the inter RAT information included in the Mobility-FromNRCommand message, causing the UE to fail the procedure according to the specification applicable for the target RAT).

In FIG. 7, operations 7-05 to 7-65 may be partially omitted or may be performed in parallel.

If mobility from NR failure occurs due to the condition, the UE may not store handover failure information in VarRLF-Report, and afterward, a base station occasionally fails to collect handover failure information.

Therefore, there is desire for a method of storing handover failure information although the UE fails to perform handover due to the above-described condition, and the method will be described in detail with reference to FIG. 8.

Figure 8:
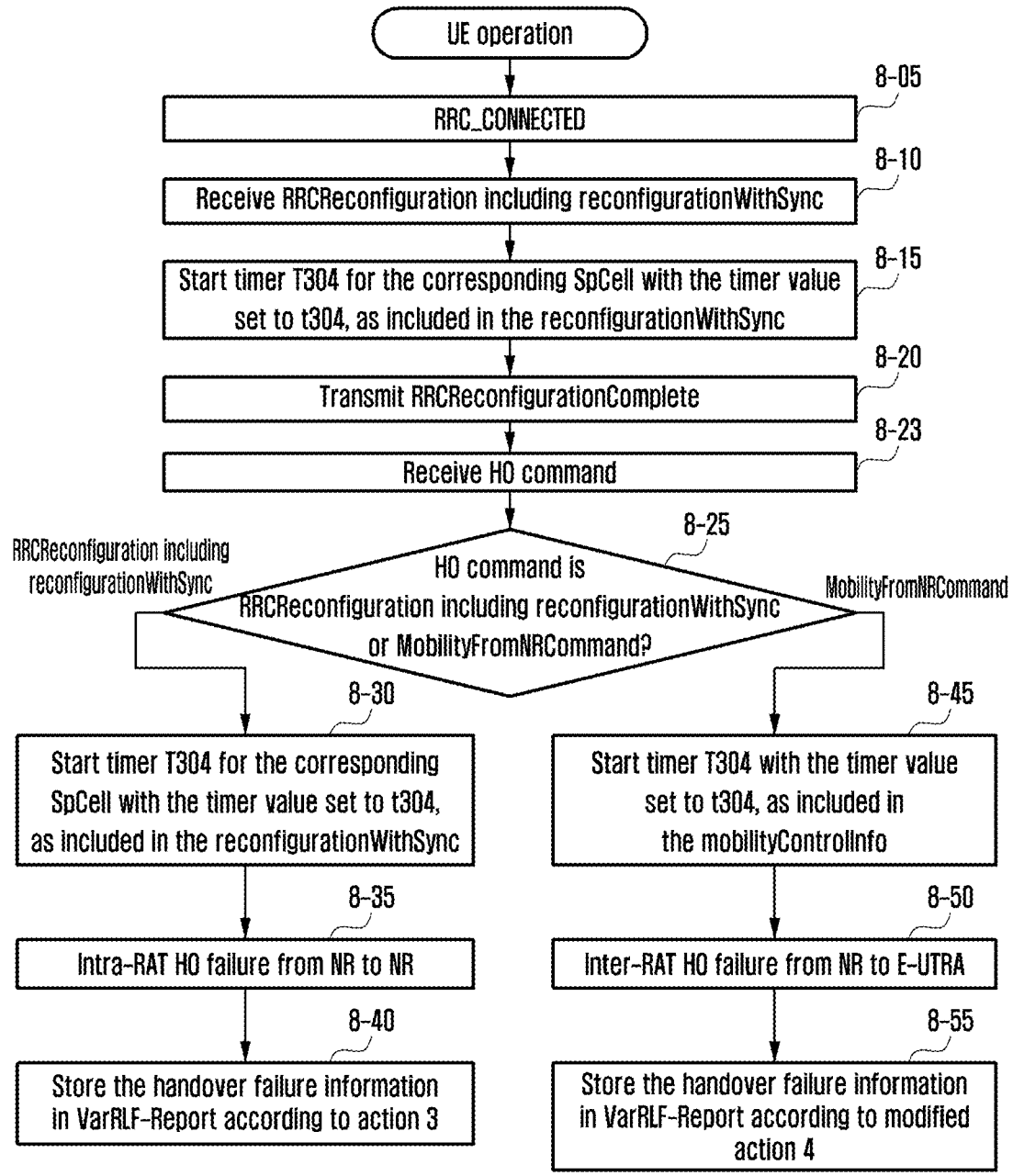
FIG. 8 is a diagram illustrating a process of storing handover failure information when a UE fails to perform handover according to an embodiment of the present disclosure.

FIG. 8 is a diagram illustrating a process of storing handover failure information when a UE fails to perform handover according to an embodiment of the present disclosure.

Referring to FIG. 8, the UE may establish an RRC connection to an NR base station, and may be in an RRC connected mode (RRC_CONNECTED) in operation 8-05.

In operation 8-10, the UE may receive an RRCReconfiguration message including reconfigurationWithSync from the NR base station.

In operation 8-15, the UE may operate a timer T304 for a corresponding SpCell using a t304 timer value included in reconfigurationWithSync (start timer T304 for the corresponding SpCell with the timer value set to t304, as included in the reconfigurationWithSync). If frequencyInfoDL is included in reconfigurationWithSync, a cell on an SSB frequency indicated by frequencyinfoDL with a physical cell identity indicated by physCellId may be regarded as a target SpCell (if the frequencyInfoDL is included, consider the target SpCell to be one on the SSB frequency indicated by the frequencyInfoDL with a physical cell identity indicated by the physCellId). Otherwise (if frequencyInfoDL is not included in reconfigurationWithSync), a cell on an SSB frequency of a source SpCell with a physical cell identity indicated by physCellId may be regarded as a target SpCell (else, consider the target SpCell to be one on the SSB frequency of the source SpCell with a physical cell identity indicated by the physCellId).

In operation 8-20, the UE successfully performs reconfiguration with sync (i.e., handover) and may transmit an RRCReconfigurationComplete message to the target SpCell.

In operation 8-23, the UE may receive a HO command from the NR base station.

In operation 8-25, if the UE determines that the HO Command received in operation 8-23 is RRCReconfiguration including reconfigurationWithSync, the UE may operate a timer T304 for the corresponding SpCell using a t304 timer value included in reconfigurationWithSync in operation 8-30.

In operation 8-35, the UE may identify that intra-RAT handover (handover from an NR cell to the NR cell) fails due to a predetermined reason. The predetermined reason may be the case in which timer T304 operated in operation 8-30 expires.

In operation 8-40, the UE may store handover failure information in VarRLF-Report. The UE may perform above-described action 3 and may store handover failure information in VarRLF-Report.

In operation 8-25, if the UE determines that the HO Command received in operation 8-23 is MobilityFromNR-Command, the UE may operate timer T304 using a t304 timer value included in mobilityControlInfo in operation 8-45.

In operation 8-50, the UE may identify that inter-RAT handover (handover from an NR cell to an E-UTRA cell, mobility from NR failure) fails due to a predetermined reason. If mobility from NR failure occurs due to at least one of the following conditions, the UE according to an embodiment of the disclosure may perform operation 8-55.

Condition:
(1) if a UE fails to connect to a target radio access technology (UE does not succeed in establishing the connection to the target radio access technology);
(2) if the UE is incapable of complying with configuration included in MobilityFromNRCommand (UE is unable to comply with any part of the configuration included in the MobilityFromNRCommand); or
(3) if a protocol error occurs in inter RAT information included in MobilityFromNRCommand, and the UE fails a procedure according to the specification applicable to a target RAT (there is a protocol error in the inter RAT information included in the Mobility-FromNRCommand message, causing the UE to fail the procedure according to the specification applicable for the target RAT).

In operation 8-55, if the UE supports a radio link failure report for inter-RAT MRO EUTRA and the Mobility-FromNRCommand message received in operation 8-25 corresponds to inter-RAT handover failure from NR to E-UTRA (MobilityFromNRCommand concerned a failed inter-RAT handover from NR to E-UTRA and the UE supports radio link failure report for Inter-RAT MRO EUTRA), the UE may store handover failure information in VarRLF-Report. The UE may perform action 4 described below and may store handover failure information in VarRLF-Report.

Modified action 4:
(1) the UE deletes information in VarRLF-Report (clear the information included in VarRLF-Report, if any);
(2) the UE sets plmn-IdentityList to include the list of stored EPLMNs and an RPLM (set the plmn-IdentityList to include the list of EPLMNs stored by the UE (i.e., includes the RPLMN));
(3) the UE stores measurement values of a source PCell and measurement values of neighboring cells;
(4) the UE sets c-RNTI to C-RNTI used in the source PCell (set the c-RNTI to the C-RNTI used in the source PCell (in case HO failure));
(5) the UE sets connectionFailureType to hof,
(6) the UE sets eutraFailedPCellId in failedPCellId to a global cell identity and tracing area code, if available, and otherwise, set eutraFailedPCellId in failedPCellId to the physical cell identity and the carrier frequency of a target PCell to which handover fails (set the eutraFailedPCellId in failedPCellId to the global cell identity and tracking area code, if available, and otherwise to the physical cell identity and carrier frequency of the target PCell of the failed handover);
(7) the UE sets nrPreviousCell of previousPCellId to the global cell identity and tracking area code of the PCell of the HO command message (i.e., MobilityFromNR- Command) received in operation 8-23 and include the same (include nrPreviousCell in previousPCellId and set it to the global cell identity and tracking area code of the PCell where the last MobilityFromNRCommand message was received);

(8) the UE sets timeConnFailure to the period of time elapsing from the point in time of reception of the HO command message (i.e., MobilityFromNRCommand) received in operation 8-23 (set the timeConnFailure to the elapsed time since reception of the last MobilityFromNRCommand); and/or (9) the UE does not include the same in ra-InformationCommon. Alternatively, include at least one of the following random access information in VarRLF-Report:

(i) ARFCN-ValueEUTRA;
(ii) information associated with contention based random access resource or information associated with contention free random access resource; and
(iii) following information or information list in chronological order
  (a) the number of times that random access is continuously attempted;
  (b) whether contention detection occurs;
  (c) whether rsrp-Threshold exceeds in the case of transmission of a preamble; and/or
  (d) a cause of performing random access.

Operations 8-30 to 8-40 of FIG. 8 are the same as the descriptions which have been described above, and will be omitted herein.

In FIG. 8, operations 8-05 to 8-55 may be partially omitted or may be performed in parallel.

Figure 9:
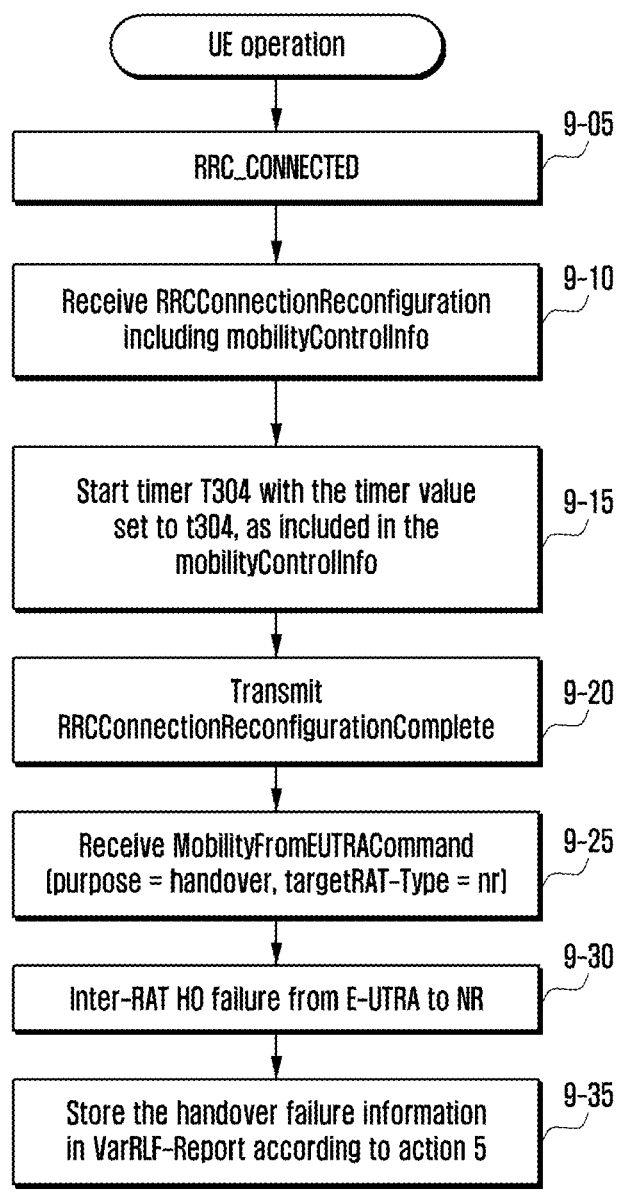
FIG. 9 is a diagram illustrating a process of storing handover failure information when a UE fails to perform handover according to an embodiment of the present disclosure.

FIG. 9 is a diagram illustrating a process of storing handover failure information when a UE fails to perform handover according to an embodiment of the present disclosure.

Referring to FIG. 9, the UE may set up an RRC connection to an LTE base station, and may be in an RRC connected mode (RRC_CONNECTED) in operation 9-05.

In operation 9-10, the UE may receive an RRCConnectionReconfiguration message including mobilityControlInfo from the LTE base station.

In operation 9-15, the UE may operate timer T304 using a t304 timer value included in mobilityControlInfo (start timer T304 with the timer value set to t304, as included in the mobilityControlInfo).

In operation 9-20, the UE may successfully perform handover and may transmit an RRCConnectionReconfigurationComplete message to a target PCell.

In operation 9-25, the UE may receive a MobilityFromEUTRACommand message from the LTE base station. The UE may identify that a purpose is set to handover and targetRAT-Type is set to nr in the received MobilityFromEUTRACommand message.

In operation 9-30, the UE may identify that inter-RAT handover (handover from an E-UTRA cell to an NR cell) fails due to a predetermined reason. The predetermined reason may be at least one of the following examples.

In one example, whether the UE fails to connect to a target radio access technology (UE does not succeed in establishing the connection to the target radio access technology).

In one example, whether the UE is incapable of complying with a configuration included in MobilityFromEUTRACommand (UE is unable to comply with any part of the configuration included in the MobilityFromEUTRACommand).

In one example, whether a protocol error occurs in inter RAT information included in MobilityFromEUTRACommand, and the UE fails a procedure according to the specification applicable to a target RAT (there is a protocol error in the inter RAT information included in the MobilityFromEUTRACommand message, causing the UE to fail the procedure according to the specification applicable for the target RAT).

In operation 9-35, if the UE supports a radio link failure report for inter-RAT MRO NR and the MobilityFromEUTRACommand message received in operation 9-25 corresponds to inter-RAT handover failure from EUTRA to NR (MobilityFromEUTRACommand concerned a failed inter-RAT handover from E-UTRA to NR and the UE supports radio link failure report for Inter-RAT MRO NR), the UE may store handover failure information in VarRLF-Report. The UE may perform action 5 described below and may store handover failure information in VarRLF-Report.

In one example (e.g., Action 5):

(1) the UE deletes information in VarRLF-Report (clear the information included in VarRLF-Report, if any);
(2) the UE sets plmn-IdentityList to include the list of stored EPLMNs and an RPLM (set the plmn-IdentityList to include the list of EPLMNs stored by the UE (i.e., includes the RPLMN));
(3) the UE stores measurement values of a source PCell and measurement values of neighboring cells;
(4) the UE sets failedNR-PCellId to a global cell identity and tracing area code, and otherwise, sets failedNR-PCellId to the physical cell identity and the carrier frequency of a target PCell to which handover fails (set the failedNR-PCellId to the global cell identity and tracking area code, if available, and otherwise to the physical cell identity and carrier frequency of the target PCell of the failed handover);
(5) the UE sets PreviousCellID to the global cell identity and tracking area code of the PCell of MobilityFromEUTRACommand received in operation 9-25 and includes the same (include previousPCellId and set it to the global cell identity and tracking area code of the PCell where the last MobilityFromEUTRACommand message was received);
(6) the UE sets timeConnFailure to the period of time elapsing from the point in time of reception of MobilityFromEUTRACommand received in operation 9-25 (set the timeConnFailure to the elapsed time since reception of the last MobilityFromEUTRACommand);
(7) the UE sets c-RNTI to C-RNTI used in the source PCell (set the c-RNTI to the C-RNTI used in the source PCell (in case HO failure));
(8) the UE sets connectionFailureType to hof; and/or
(9) the UE includes information related to random access in ra-InformationCommon In this instance, information related to random access may be included in ra-InformationCommon according to TS 38.331, and for example, ra-InformationCommon may have a structure as shown in Table 11.

TABLE 11

```
RA-InformationCommon-r16 ::=         SEQUENCE {
    absoluteFrequencyPointA-r16      ARFCN-ValueNR,
    locationAndBandwidth-r16         INTEGER (0..37949),
    subcarrierSpacing-r16            SubcarrierSpacing,
    msg1-FrequencyStart-r16          INTEGER (0..maxNrofPhysicalResourceBlocks-
1)  OPTIONAL,
    msg1-FrequencyStartCFRA-r16                              INTEGER
(0..maxNrofPhysicalResourceBlocks-1)  OPTIONAL,
    msg1-SubcarrierSpacing-r16       SubcarrierSpacing      OPTIONAL,
    msg1-SubcarrierSpacingCFRA-r16                          SubcarrierSpacing
OPTIONAL,
    msg1-FDM-r16                     ENUMERATED {one, two, four, eight}
OPTIONAL,
    msg1-FDMCFRA-r16                 ENUMERATED {one, two, four, eight}
OPTIONAL,
    perRAInfoList-r16                PerRAInfoList-r16
}
```

In the disclosure, supporting a radio link failure report for inter-RAT MRO NR may refer to the following.

TABLE 12

It is optional for UE to include previousNR-PCellId, failedNR-PCellId and nrReconnectCellId in RLF-Report upon request from the network as specified in TS 36.331.

In FIG. 9, operations 9-05 to 9-35 may be partially omitted or may be performed in parallel.

Figure 10:
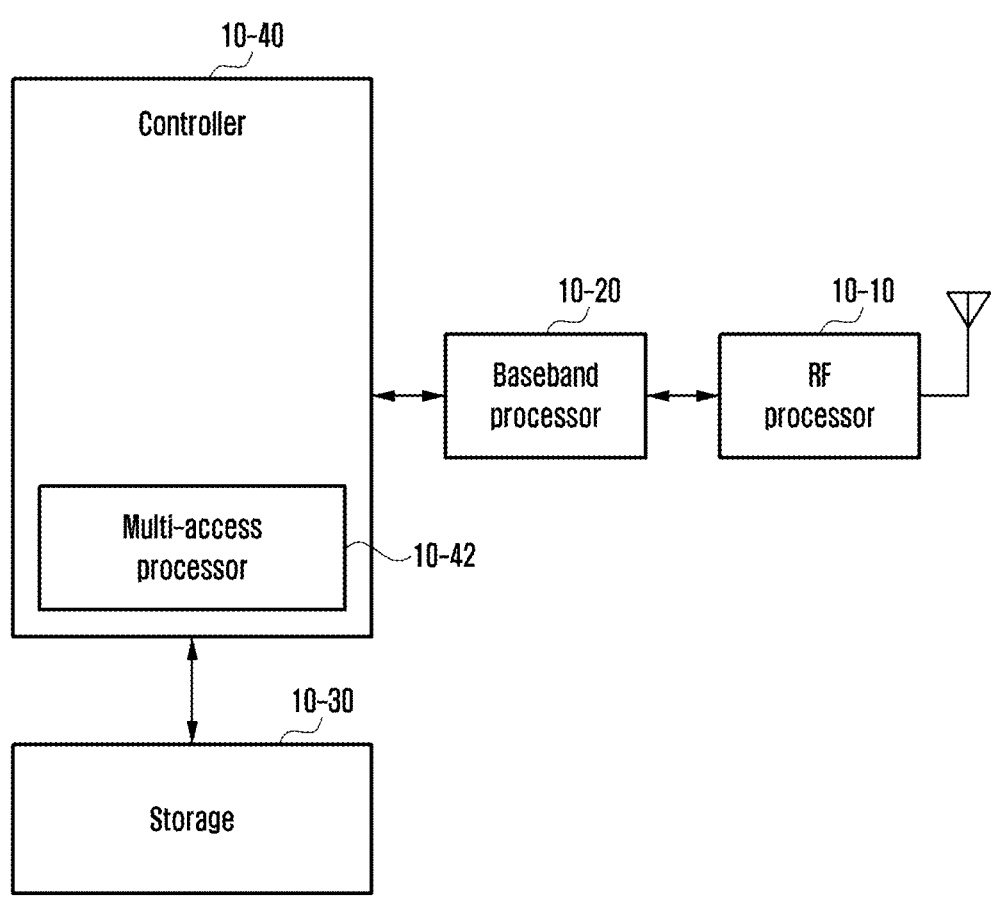
FIG. 10 is a block diagram illustrating the structure of a UE according to an embodiment of the present disclosure.

FIG. 10 is a block diagram illustrating the structure of a UE according to an embodiment of the present disclosure.

Referring to FIG. 10, the UE includes a radio frequency (RF) processor 10-10, a baseband processor 10-20, a storage 10-30, and a controller 10-40. The controller 10-40 includes a multi-access processor 10-42.

The RF processor 10-10 performs a function for transmitting or receiving a signal via a wireless channel, such as band conversion and amplification of a signal. That is, the RF processor 10-10 up-converts a baseband signal provided from the baseband processor 10-20 into an RF band signal so as to transmit the RF band signal via an antenna, and down-converts an RF band signal received via the antenna into a baseband signal.

For example, the RF processor 10-10 may include a transmission filter, a reception filter, an amplifier, a mixer, an oscillator, a digital-to-analog converter (DAC), an analog-to-digital converter (ADC), and the like. Although only a single antenna is illustrated in the drawing, the UE may include a plurality of antennas. In addition, the RF processor 10-10 may include a plurality of RF chains. Moreover, the RF processor 10-10 may perform beamforming. For the beamforming, the RF processor 10-10 may control the phase and the size of each of the signals transmitted or received via a plurality of antennas or antenna elements. In addition, the RF processor may perform MIMO, and may receive multiple layers when performing a MIMO operation.

The baseband processor 10-20 performs a function of converting between a baseband signal and a bitstream according to the physical layer standard of a system. For example, in the case of data transmission, the baseband processor 10-20 encodes and modulates a transmission bitstream, so as to produce complex symbols. In addition, in the case of data reception, the baseband processor 10-20, restores a reception bitstream by demodulating and decoding a baseband signal provided from the RF processor 10-10.

For example, according to an orthogonal frequency division multiplexing (OFDM) scheme, in the case of data transmission, the baseband processor 10-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. Further, in the case of data reception, the baseband processor 10-20 divides the baseband signal provided from the RF processor 10-10 in units of OFDM symbols, reconstructs the signals mapped to the subcarriers via a fast Fourier transform (FFT) operation, and then reconstructs a received bitstream via demodulation and decoding.

The baseband processor 10-20 and the RF processor 10-10 transmit and receive signals as described above. Accordingly, the baseband processor 10-20 and the RF processor 10-10 may be referred to as a transmitter, a receiver, a transceiver, or a communication unit. Furthermore, at least one of the baseband processor 10-20 and the RF processor 10-10 may include a plurality of communication modules in order to support different multiple radio access technologies. In addition, at least one of the baseband processor 10-20 and the RF processor 10-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band and a millimeter wave (mm wave) (e.g., 60 GHz) band.

The storage 10-30 may store data such as a basic program, an application program, and configuration information for the operation of the UE. Particularly, the storage 10-30 may store information related to a second access node that performs wireless communication using a second radio access technology. In addition, the storage 10-30 provides data stored therein in response to a request from the controller 10-40.

The controller 10-40 controls overall operation of the UE. For example, the controller 10-40 may perform transmission or reception of a signal via the baseband processor 10-20 and the RF processor 10-10. In addition, the controller 10-40 may record data in the storage 10-40 and read the data. To this end, the controller 10-40 may include at least one processor. For example, the controller 10-40 may include a communication processor (CP) that performs control for communication, and an application processor (AP) that controls a higher layer such as an application program.

Figure 11:
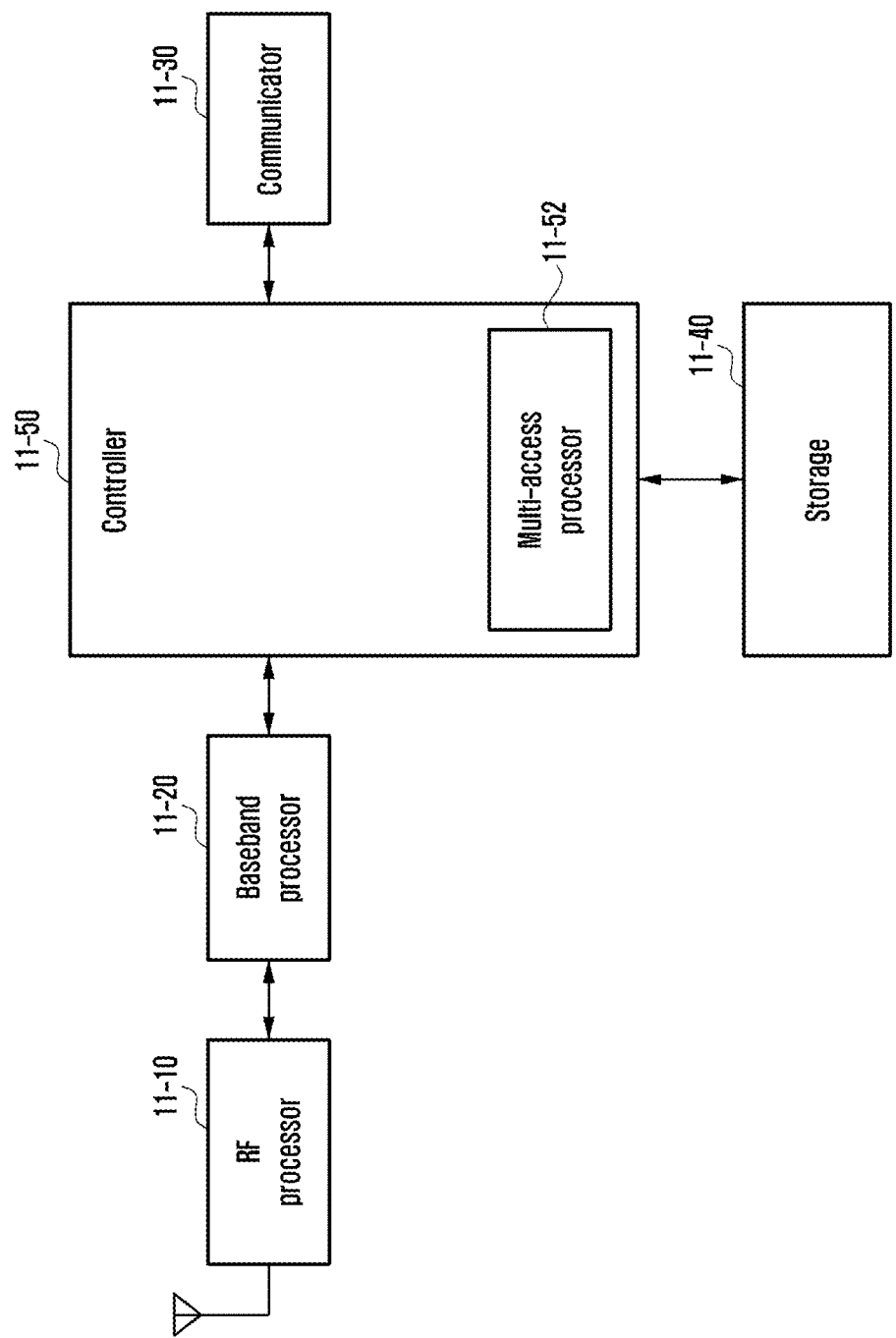
FIG. 11 is a block diagram illustrating the structure of a base station according to an embodiment of the present disclosure.

FIG. 11 is a block diagram illustrating the structure of a base station according to an embodiment of the present disclosure.

Referring to FIG. 11, the base station may include an RF processor 11-10, a baseband processor 11-20, a backhaul communication unit 11-30, a storage 11-40, and a controller 11-50.

The RF processor 11-10 performs a function for transmitting or receiving a signal via a wireless channel, such as band conversion and amplification of a signal. That is, the RF processor 11-10 up-converts a baseband signal provided from the baseband processor 11-20 into an RF band signal so as to transmit the RF band signal via an antenna, and down-converts an RF band signal received via the antenna into a baseband signal.

For example, the RF processor 11-10 may include a transmission filter, a reception filter, an amplifier, a mixer, an oscillator, a DAC, an ADC, and the like. Although only a single antenna is illustrated in the drawing, a plurality of antennas may be included. In addition, the RF processor 11-10 may include a plurality of RF chains. In addition, the RF processor 11-10 may perform beamforming. For the beamforming, the RF processor 11-10 may control the phase and the size of each of the signals transmitted or received via a plurality of antennas or antenna elements. The RF processor may perform a downlink MIMO operation by transmitting one or more layers.

The baseband processor 11-20 performs a function of conversion between a baseband signal and a bitstream according to the physical layer standard. For example, in the case of data transmission, the baseband processor 11-20 encodes and modulates a transmission bitstream, so as to produce complex symbols. In addition, in the case of data reception, the baseband processor 11-20, restores a reception bitstream by demodulating and decoding a baseband signal provided from the RF processor 11-10.

For example, according to the OFDM scheme, in the case of data transmission, the baseband processor 11-20 may produce complex symbols by encoding and modulating a transmission bitstream, map the complex symbols to subcarriers, and then configure OFDM symbols via an IFFT operation and CP insertion. In addition, in the case of data reception, the baseband processor 11-20 divides a baseband signal provided from the RF processor 11-10 in units of OFDM symbols, restores signals mapped onto the subcarriers via the FFT operation, and restores a received bit stream via demodulation and decoding. The baseband processor 11-20 and the RF processor 11-10 transmit and receive signals as described above. Accordingly, the baseband processor 11-20 and the RF processor 11-10 may be referred to as a transmitter, a receiver, a transceiver, a communication unit, or a wireless communication unit.

The backhaul communication unit 11-30 may provide an interface for performing the communication with other nodes in a network. That is, the backhaul communication unit 11-30 may convert, into a physical signal, a bit stream transmitted from the primary base station to another node, for example, a secondary base station, a core network, and the like, and may convert a physical signal received from the other node into a bit stream.

The storage 11-40 stores data such as a basic program, an application program, and configuration information for the operation of the primary base station. Particularly, the storage 11-40 may store information associated with a bearer allocated to a connected UE, a measurement result reported from a connected UE, and the like. In addition, the storage 11-40 may provide multiple accesses to a UE, or may store information which is a criterion for determining whether to disconnect the access. In addition, the storage 11-40 provides data stored therein according to a request of the controller 11-50.

The controller 11-50 may control the overall operation of the primary base station. For example, the controller 11-50 may transmit or receive a signal via the baseband processor 11-20 and the RF processor 11-10, or via the backhaul communication unit 11-30. In addition, the controller 11-50 may record data in the storage 11-40 and read the data. To this end, the controller 11-50 may include at least one processor.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, one or more of the above embodiments may be employed in combination, as necessary.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

In addition, the methods described in FIGS. 1 to 11 of the disclosure may include methods based on combinations of at least one of the drawings according to various implementation. For example, FIGS. 1 to 11 may be combined to be performed as one sequence. The disclosure may include methods based on combinations of at least one drawings according to various implementation.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
 receiving, from a base station associated with new radio-radio access (NR), a command message for inter-radio access technology (RAT) handover from the NR to a target RAT, wherein the command message includes information on a type of the target RAT;
 performing a procedure associated with the inter-RAT handover based on the command message;
 in case that a failure condition for the inter-RAT handover is satisfied, identifying that the inter-RAT handover fails; and
 in case that the type of the target RAT is set to evolved universal terrestrial radio access (EUTRA) and the UE supports a radio link failure report for inter-RAT mobility robustness optimization (MRO) EUTRA, storing handover failure information in a variable for the radio link failure report based on an identification that the inter-RAT handover fails.

2. The method of claim 1,
 wherein the failure condition for the inter-RAT handover is satisfied when:
 the UE does not succeed in establishing a connection to the target RAT;
 the UE is unable to comply with any part of a configuration included in the command message; or a protocol error occurs in inter-RAT information included in the command message, the protocol error causing the UE to fail a procedure applicable for the target RAT.

3. The method of claim 1, wherein storing the handover failure information comprises:
including NR previous cell information in previous cell identifier (ID) information of the variable for the radio link failure report; and
setting the NR previous cell information to a global cell identity and a tracking area code of a primary cell (PCell) where the command message was received.

4. The method of claim 1, wherein storing the handover failure information comprises:
setting time connection failure information of the variable for the radio link failure report to an elapsed time since reception of the command message.

5. The method of claim 1, wherein storing the handover failure information comprises:
in case that the command message is associated with the failed inter-RAT handover from the NR to the EUTRA and the UE supports the radio link failure report for the inter-RAT MRO EUTRA, setting EUTRA failed primary cell (PCell) identifier (ID) information of the variable for the radio link failure report to a global cell identity and a tracking area code.

6. The method of claim 1, wherein storing the handover failure information comprises:
in case that the command message is associated with the failed inter-RAT handover from the NR to the EUTRA and the UE supports the radio link failure report for the inter-RAT MRO EUTRA, setting EUTRA failed primary cell (PCell) identifier (ID) information of the variable for the radio link failure report to a physical cell identity and a carrier frequency of a target PCell of the failed inter-RAT handover.

7. The method of claim 1, further comprising:
in case that the inter-RAT handover is successfully completed, skipping stopping a timer associated with logged measurement.

8. The method of claim 1, further comprising:
in case that connection failure type information of the variable for the radio link failure report is set to a handover failure and a failed handover is an intra-RAT handover, setting common random-access related information of the variable for the radio link failure report to include random-access related information used in a random access procedure.

9. A user equipment (UE) in a communication system, the UE comprising:
a transceiver; and
a controller operably coupled to the transceiver, the controller configured to:
receive, from a base station associated with new radio-radio access (NR) via the transceiver, a command message for inter-radio access technology (RAT) handover from the NR to a target RAT, wherein the command message includes information on a type of the target RAT,
perform a procedure associated with the inter-RAT handover based on the command message,
in case that a failure condition for the inter-RAT handover is satisfied, identify that the inter-RAT handover fails, and
in case that the type of the target RAT is set to evolved universal terrestrial radio access (EUTRA) and the UE supports a radio link failure report for inter-RAT mobility robustness optimization (MRO) EUTRA, store handover failure information in a variable for the radio link failure report based on an identification that the inter-RAT handover fails.

10. The UE of claim 9,
wherein the failure condition for the inter-RAT handover is satisfied when:
the UE does not succeed in establishing a connection to the target RAT;
the UE is unable to comply with any part of a configuration included in the command message; or
a protocol error occurs in inter-RAT information included in the command message, the protocol error causing the UE to fail a procedure applicable for the target RAT.

11. The UE of claim 9, wherein the controller is configured to:
include NR previous cell information in previous cell identifier (ID) information of the variable for the radio link failure report, and
set the NR previous cell information to a global cell identity and a tracking area code of a primary cell (PCell) where the command message was received.

12. The UE of claim 9, wherein the controller is configured to:
set time connection failure information of the variable for the radio link failure report to an elapsed time since reception of the command message.

13. The UE of claim 9, wherein the controller is configured to:
in case that the command message is associated with the failed inter-RAT handover from the NR to the EUTRA and the UE supports the radio link failure report for the inter-RAT MRO EUTRA, set EUTRA failed primary cell (PCell) identifier (ID) information of the variable for the radio link failure report to a global cell identity and a tracking area code.

14. The UE of claim 9, wherein the controller is configured to:
in case that the command message is associated with the failed inter-RAT handover from the NR to the EUTRA and the UE supports the radio link failure report for the inter-RAT MRO EUTRA, set EUTRA failed primary cell (PCell) identifier (ID) information of the variable for the radio link failure report to a physical cell identity and a carrier frequency of a target PCell of the failed inter-RAT handover.

15. The UE of claim 9, wherein the controller is further configured to:
in case that the inter-RAT handover is successfully completed, skip stopping a timer associated with logged measurement.

16. The UE of claim 9, wherein the controller is further configured to:
in case that connection failure type information of the variable for the radio link failure report is set to a handover failure and a failed handover is an intra-RAT handover, set common random-access related information of the variable for the radio link failure report to include random-access related information used in a random access procedure.

* * * * *